(12) United States Patent
Zhang et al.

(10) Patent No.: US 12,213,158 B2
(45) Date of Patent: *Jan. 28, 2025

(54) SYSTEMS AND METHODS FOR MULTIPLE REDUNDANT TRANSMISSIONS FOR USER EQUIPMENT COOPERATION

(71) Applicants: Liqing Zhang, Kanata (CA); Jianglei Ma, Kanata (CA); Hua Xu, Kanata (CA); Seyedarvin Ayoughi, Kanata (CA)

(72) Inventors: Liqing Zhang, Kanata (CA); Jianglei Ma, Kanata (CA); Hua Xu, Kanata (CA); Seyedarvin Ayoughi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,456

(22) Filed: Nov. 9, 2023

(65) Prior Publication Data

US 2024/0073932 A1     Feb. 29, 2024

Related U.S. Application Data

(63) Continuation of application No. 17/952,791, filed on Sep. 26, 2022, now Pat. No. 11,818,736, which is a
(Continued)

(51) Int. Cl.
*H04W 72/30* (2023.01)
*H04L 1/08* (2006.01)
(Continued)

(52) U.S. Cl.
CPC ............... *H04W 72/30* (2023.01); *H04L 1/08* (2013.01); *H04L 1/1896* (2013.01);
(Continued)

(58) Field of Classification Search
CPC ....... H04W 72/005; H04W 4/06; H04W 8/26; H04W 72/30; H04W 72/23; H04W 88/04;
(Continued)

(56) References Cited

U.S. PATENT DOCUMENTS 11,490,360 B2    11/2022  Zhang et al.
11,765,555 B1 *   9/2023  Babaei ................... H04W 80/04
                                                              370/312
(Continued)

FOREIGN PATENT DOCUMENTS

CN       104662817 A      5/2015
CN       108243395 A      7/2018
(Continued)

OTHER PUBLICATIONS

Huawei et al., 3GPP TSG RAN WGI Meeting #85, R1-164379, "Support for UE Cooperation in NR", May 27, 2016 (May 27, 2016) sections 3 and 4, 7 pages.
(Continued)

*Primary Examiner* — Peter G Solinsky
*Assistant Examiner* — Sanjay K Dewan

(57) ABSTRACT

Aspects of the present application provide methods and device for use in User Equipment (UE) cooperation. UE cooperation may include the cooperating UEs (CUEs) forwarding traffic to or from one or more target UEs (TUEs) with redundant signal transmissions or receptions. Methods involve a base station transmitting configuration information to at least one cooperative user equipment (CUE) and to a target user equipment (TUE). The configuration information includes an indication of resources for a sidelink (SL) transmission and a redundancy parameter for the SL transmission. The SL transmission is a transmission for the at least one CUE to forward a packet intended for the TUE. The base station also transmits the packet intended for the
(Continued)

TUE, to a plurality of UEs comprising the at least one CUE and the TUE.

20 Claims, 16 Drawing Sheets

Related U.S. Application Data continuation of application No. 16/848,191, filed on Apr. 14, 2020, now Pat. No. 11,490,360.

(60) Provisional application No. 62/835,748, filed on Apr. 18, 2019.

(51) Int. Cl.
    *H04L 1/1867* (2023.01)
    *H04W 72/23* (2023.01)
    *H04W 88/04* (2009.01)
    *H04W 92/10* (2009.01)
    *H04W 92/18* (2009.01)

(52) U.S. Cl.
    CPC ............ *H04W 72/23* (2023.01); *H04W 88/04* (2013.01); *H04W 92/10* (2013.01); *H04W 92/18* (2013.01)

(58) Field of Classification Search
    CPC .... H04W 92/10; H04W 92/18; H04L 12/189; H04L 12/185; H04L 1/08; H04L 1/1896
    USPC ......................................................... 370/312
    See application file for complete search history.

(56) References Cited

U.S. PATENT DOCUMENTS

| | | | |
|---|---|---|---|
| 11,778,426 B2 * | 10/2023 | Zhou ..................... | H04L 1/1893 |
| | | | 370/312 |
| 11,818,736 B2 | 11/2023 | Zhang et al. | |
| 2011/0034163 A1 | 2/2011 | Zhu et al. | |
| 2011/0090835 A1 | 4/2011 | Furukawa et al. | |
| 2012/0149348 A1 | 6/2012 | Patel et al. | |
| 2013/0191121 A1 * | 7/2013 | Rajendran ............. | G10L 19/005 |
| | | | 704/229 |
| 2014/0098731 A1 * | 4/2014 | Maaref ................. | H04W 76/40 |
| | | | 370/312 |
| 2014/0177542 A1 | 6/2014 | Novak et al. | |
| 2015/0029890 A1 * | 1/2015 | Siomina .............. | H04L 12/1877 |
| | | | 370/312 |
| 2015/0117377 A1 | 4/2015 | Maaref et al. | |
| 2016/0044634 A1 * | 2/2016 | Seo ......................... | H04W 4/06 |
| | | | 370/312 |
| 2016/0105880 A1 * | 4/2016 | Bao ......................... | H04W 4/06 |
| | | | 370/312 |
| 2016/0192326 A1 | 6/2016 | Park et al. | |
| 2016/0234754 A1 | 8/2016 | Baghel | |
| 2016/0262034 A1 | 9/2016 | Gulati et al. | |
| 2017/0034688 A1 | 2/2017 | Kim et al. | |
| 2017/0171899 A1 | 6/2017 | Seo et al. | |
| 2017/0331670 A1 | 11/2017 | Parkvall et al. | |
| 2019/0174530 A1 | 6/2019 | Kim et al. | |
| 2019/0274054 A1 | 9/2019 | Salem | |
| 2019/0306835 A1 | 10/2019 | Hoang et al. | |
| 2019/0306912 A1 | 10/2019 | Cheng et al. | |
| 2019/0342910 A1 | 11/2019 | Cao et al. | |
| 2020/0053835 A1 | 2/2020 | Ye et al. | |
| 2020/0059821 A1 | 2/2020 | Wirth et al. | |
| 2020/0077432 A1 | 3/2020 | Xiong et al. | |
| 2020/0259600 A1 | 8/2020 | Cao et al. | |
| 2020/0314940 A1 * | 10/2020 | Park ...................... | H04W 76/18 |
| 2020/0336178 A1 | 10/2020 | Ma et al. | |
| 2021/0136845 A1 | 5/2021 | Liu et al. | |
| 2021/0328725 A1 | 10/2021 | Jassal et al. | |
| 2022/0141834 A1 | 5/2022 | Chang et al. | |
| 2022/0141861 A1 | 5/2022 | Rico Alvarino et al. | |
| 2023/0180269 A1 * | 6/2023 | Li ......................... | H04W 72/30 |
| | | | 370/312 |

FOREIGN PATENT DOCUMENTS

| | | |
|---|---|---|
| CN | 108512576 A | 9/2018 |
| CN | 109120314 A | 1/2019 |
| CN | 109428680 A | 3/2019 |
| WO | 2018202798 A1 | 11/2018 |

OTHER PUBLICATIONS

3GPP TSG RAN WG1 Meeting #85, Nanjing, China, May 23-27, 2016, R1-164379, Agenda Item: 7.1.7, Source: Huawei, HiSilicon, Title: Support for UE Cooperation in NR. (Year: 2016).

* cited by examiner

SYSTEMS AND METHODS FOR MULTIPLE REDUNDANT TRANSMISSIONS FOR USER EQUIPMENT COOPERATION

RELATED APPLICATIONS

This is a continuation of U.S. patent application Ser. No. 17/952,791 filed Sep. 26, 2022, which is a continuation of U.S. patent application Ser. No. 16/848,191 filed Apr. 14, 2020, and claims the benefit of priority of U.S. Provisional Patent Application No. 62/835,748 filed on Apr. 18, 2019, both of which are hereby incorporated by reference.

TECHNICAL FIELD

The present disclosure relates generally to wireless communications, and in particular embodiments, to User Equipment (UE) cooperation, in particular multiple redundant transmissions.

BACKGROUND

In some wireless communication systems, user equipments (UEs) wirelessly communicate with a base station (or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

UE cooperation has been proposed to enhance reliability, throughput/capacity, and coverage. For example, UE cooperation can be used to provide diversity in space, time and frequency, and increase the robustness against fading and interference. In UE cooperation, SL communications are used to establish joint UE reception, where some of the UEs, referred to as cooperating UEs (CUEs), act as relays for other UEs, referred to as target UEs (TUEs) to improve system throughput and coverage. However, joint UE reception using SL communications can also increase the complexity of the network communications, such as for hybrid-automatic repeat request (HARQ) signaling. The HARQ mechanism is a link adaptation technique that can improve communications for erroneous data packets in wireless communication networks.

SUMMARY

According to a first aspect of the disclosure, there is provided a method that includes: transmitting, by the base station, configuration information to at least one cooperative user equipment (CUE) and to a target user equipment (UE), the configuration information comprising an indication of resources for a sidelink (SL) transmission and a redundancy parameter for the SL transmission, the SL transmission for the at least one CUE to forward a packet intended for the TUE. The method further includes transmitting, by the base station, the packet intended for the TUE, to a plurality of UEs comprising the at least one CUE and the TUE.

In some embodiments, transmitting configuration information to the at least one CUE and to the TUE includes: the base station transmitting to the at least one CUE: an identification of the TUE that the at least one CUE is to aid by forwarding the packet intended for the TUE, and an identification of initial or redundant transmission signals associated with a specific CUE and a number of repetitions; and the base station transmitting to the TUE: an identification of initial or redundant transmission signals associated with the TUE and a number of repetitions.

In some embodiments, the configuration information further comprises one or more of: a diversity scheme to be used for transmission by the at least one CUE; a forwarding scheme to be used for transmission by the at least one CUE; and a diversity scheme to be used for transmission by the TUE.

In some embodiments, the resources for the SL transmission comprise resources for an acknowledgment transmission from the TUE to the at least one CUE.

In some embodiments, configuration information that is the same for multiple UEs of the plurality of UEs is transmitted using groupcast, multicast or broadcast transmissions; or configuration information that is unique to a given UE of the plurality of UEs is transmitted using unicast transmissions.

In some embodiments, transmitting the configuration information comprises at least one of: transmitting the configuration information in a pre-configured manner; transmitting the configuration information semi-statically; and transmitting the configuration information dynamically.

In some embodiments, transmitting the configuration information comprises at least one of: transmitting the configuration information in radio resource control (RRC) signaling; transmitting the configuration information in downlink control information (DCI) signaling or sidelink control information signaling (SCI), or both; and transmitting the configuration information in RRC and DCI/SCI signaling.

In some embodiments, the redundancy index is an identification of initial or redundant version transmission signals to be used for at least one of transmission by the at least one CUE or by the TUE is one of: chase combining (CC) hybrid automatic repeat request (HARQ); and incremental redundancy (IR) HARQ.

In some embodiments, the identification of initial or redundant version transmission signals to be used for at least one of transmission by the at least one CUE or by the TUE is a redundancy index.

In some embodiments, the diversity scheme to be used for at least one of transmission by the at least one CUE or by the TUE is one of: an Alamouti diversity scheme; and a cyclic delay diversity (CCD) scheme.

In some embodiments, the forwarding scheme to be used for at least one of transmission by the at least one CUE is one of: a decode and forward (DF) scheme; an amplify and forward (AF) scheme; a quantization and forward (QF) scheme; and a compress and forward (CF) scheme.

In some embodiments, the method further includes transmitting a packet that is intended for the TUE via unicast, groupcast, multicast or broadcast to the plurality of UEs.

According to a second aspect of the disclosure, there is provided a device that includes a processor and a computer-readable medium having stored thereon computer-implemented instructions. The computer-implemented instructions, when executed by the processor cause the device to transmit configuration information to at least one cooperative user equipment (CUE) and to a target user equipment (TUE), the configuration information comprising an indication of resources for a sidelink (SL) transmission and a redundancy parameter for the SL transmission, the SL transmission for the at least one CUE to forward a packet intended for the TUE. The computer-implemented instructions, when executed by the processor further cause the device to transmit the packet intended for the TUE, to a plurality of UEs comprising the at least one CUE and the TUE.

In some embodiments, the instructions further cause the device to: transmit to the at least one CUE: an identification of the TUE that the at least one CUE is to aid by forwarding the packet intended for the TUE, and an identification of initial or redundant transmission signals associated with a specific CUE and a number of repetitions; and transmit to the TUE: an identification of initial or redundant transmission signals associated with the TUE and a number of repetitions.

According to a third aspect of the disclosure, there is provided a method that includes: receiving, by a cooperative user equipment (CUE), configuration information including an indication of resources for a sidelink (SL) transmission and a redundancy parameter for the SL transmission, the SL transmission for the at least one CUE to forward a packet intended for a target user equipment (TUE); receiving, by the CUE, a packet from the at least one base station and intended for the TUE; forwarding, by the CUE, the packet intended for the TUE, forwarding by the CUE, the packet intended for the TUE, by transmitting up to a maximum number of configured repetitions N, an $n^{th}$ redundant signal version having a respective modulation and coding scheme (MCS), where n=1 to N.

In some embodiments, the configuration information includes an identification of the TUE that the CUE is to aid by forwarding the packet intended for the TUE; SL transmission resources available to be used by the CUE for forwarding the packet intended for the TUE; an identification of initial or redundant transmission signals associated with the CUE and a number of repetitions.

In some embodiments, the method further comprises the CUE receiving the identification of the TUE from the TUE: during initial UE cooperation setup; or during a request procedure that the TUE asks for help from the CUE.

In some embodiments, the configuration information further includes one or more of: a diversity scheme to be used for transmission by the at least one CUE; and a forwarding scheme to be used for transmission by the at least one CUE.

In some embodiments, the resources for the SL transmission includes resources for an acknowledgment transmission from the TUE to the at least one CUE.

In some embodiments, forwarding the packet comprises one of: forwarding the packet using one or more repetitions on at least one configured grant transmission resource; forwarding the packet using one or more repetitions on at least one configured grant transmission resources, together with sidelink control information (SCI) for configuring one or more of: the redundant version signal information for at least one repetition of the packet, an HARQ ID associated with the packet, diversity scheme, forwarding scheme, TUE ID/designation ID in the UC group and MCS; and forwarding the packet using one or more repetitions on at least one transmission resource that is dynamically configured, together with sidelink control information (SCI) for configuring one or more of: the redundant version signal information for at least one repetition of the packet, an HARQ ID associated with the packet, diversity scheme, forwarding scheme, TUE ID/designation ID in the UC group and MCS.

In some embodiments, forwarding the packet is performed using at least one of unicast, groupcast, multicast, and broadcast transmissions.

In some embodiments, forwarding the packet on the at least one configured grant transmission resource comprises forwarding, for an nth repetition, an nth signal version, n being previously configured, and using a previously configured modulation and coding scheme (MCS).

In some embodiments, a hybrid automatic repeat request (HARQ) identifier (ID) of the repetition is determined implicitly based on previously configured transmission resources.

In some embodiments, the method further includes the CUE receiving a positive or negative acknowledgment of one or more of the repetitions of the packet on a configured grant transmission resource.

In some embodiments, forwarding the packet on the at least one configured grant transmission resource, together with SCI, comprises forwarding, for an nth repetition, an nth signal version using a modulation and coding scheme (MCS) and having a hybrid automatic repeat request (HARQ) identifier (ID), wherein the value of n, MCS and HARQ ID for the repetition are included in the SCI.

In some embodiments, the method further includes the CUE receiving a positive or negative acknowledgment of one or more of the repetitions of the packet on a configured grant transmission resource.

In some embodiments, forwarding the packet on the at least one transmission resource, together with SCI, comprises forwarding, for an nth repetition, an nth signal version using a modulation and coding scheme (MCS) and having a hybrid automatic repeat request (HARQ) identifier (ID), wherein the value of n, MCS and HARQ ID for the repetition are included in the SCI and wherein the transmission resource has been dynamically configured.

In some embodiments, the method further includes the CUE receiving a positive or negative acknowledgment of one or more of the repetitions of the packet on a transmission resource that has been pre-configured or dynamically configured.

In some embodiments, the identification of initial or redundant transmission signals to be used for at least one of transmission by the CUE is one of: chase combining (CC) hybrid automatic repeat request (HARQ); and incremental redundancy (IR) HARQ.

In some embodiments, the identification of initial or redundant version transmission signals to be used for at least one of transmission by the CUE is a redundancy index.

In some embodiments, a diversity scheme used for repetitions of the packet received by the TUE or for the positive or negative acknowledgment of one or more of the repetitions of the packet is one of: an Alamouti diversity scheme; and a cyclic delay diversity (CCD) scheme.

In some embodiments, a forwarding scheme used for repetitions of the packet received by the TUE or for the positive or negative acknowledgment of one or more of the repetitions of the packet is one of: a decode and forward (DF) scheme; an amplify and forward (AF) scheme; a quantization and forward (QF) scheme; and a compress and forward (CF) scheme.

According to a fourth aspect of the disclosure, there is provided a device including a processor and a computer-readable medium having stored thereon computer-implemented instructions. The computer-implemented instructions, when executed by the processor, cause the device to: receive configuration information comprising an indication of resources for a sidelink (SL) transmission and a redundancy parameter for the SL transmission, the SL transmission for the at least one device to a forward packet intended for a target user equipment (TUE); receive the packet from a base station and intended for the TUE; forward the packet intended for the TUE, by transmitting up to a maximum number of configured repetitions N, an $n^{th}$ redundant signal version having a respective modulation and coding scheme (MCS), where n=1 to N.

In some embodiments, the configuration information includes: an identification of the TUE that the device is to aid by forwarding the packet intended for the TUE; SL transmission resources available to be used by the device for forwarding the packet intended for the TUE; and an identification of initial or redundant transmission signals associated with the device and a number of repetitions.

In some embodiments, the instructions further cause the device to forward the packet by one of: forwarding the packet using one or more repetitions on at least one configured grant transmission resource; forwarding the packet using one or more repetitions on at least one configured grant transmission resource, together with sidelink control information (SCI) for configuring one or more of: the redundant version signal information, an HARQ ID associated with the packet, diversity scheme, forwarding scheme, feedback related info and resource allocation/indication, CUE/source ID in the UC group, TUE ID/designation ID in the UC group and MCS; and forwarding the packet using one or more repetitions on at least one transmission resource that is dynamically configured, together with sidelink control information (SCI) for configuring one or more of: the redundant version signal information, an HARQ ID associated with the packet, diversity scheme, forwarding scheme, TUE ID/designation ID in the UC group and MCS.

In some embodiments, the instructions further cause the device to receive a positive or negative acknowledgment of one or more of the repetitions of the packet: on a configured grant transmission resource; or on a transmission resource that has been pre-configured or dynamically configured.

According to a fifth aspect of the disclosure, there is provided a method including: transmitting, by a target user equipment (TUE), an identification of the TUE to at least one cooperative user equipment (CUE); receiving, by the TUE, configuration information including: an indication of resources for a sidelink (SL) transmission and a redundancy parameter for the SL transmission, the SL transmission for the at least one CUE to forward a packet intended for the TUE; receiving, by the TUE, the packet intended for the TUE, the packet including: for up to a maximum number of configured repetitions N, n=1 to N, an nth signal version having a respective modulation and coding scheme (MCS); and decoding, by the TUE, the packet using one or more received repetitions of the packet from one or more CUEs.

Additionally, or alternatively, the TUE may provide an identification of the TUE to at least one CUE during initial UE cooperation setup or during a request procedure that the TUE asks for help from the CUE.

In some embodiments, the configuration information includes: SL transmission resources available to be used by the TUE for receiving packets; and an identification of initial or redundant transmission signals associated with the TUE and a number of repetitions.

In some embodiments, the configuration information further includes a diversity scheme to be used for transmission by the TUE.

In some embodiments, the resources for the SL transmission include resources for an acknowledgment transmission from the TUE to the at least one CUE.

In some embodiments, the packet includes one of: receiving the packet as one or more repetitions on at least one configured grant transmission resource from one or more CUEs; receiving the packet as one or more repetitions on at least one configured grant transmission resource from one or more CUEs, together with sidelink control information (SCI) for configuring one or more of: the redundant version signal information for at least one repetition of the packet, an HARQ ID associated with the packet, diversity scheme, forwarding scheme, TUE ID/designation ID in the UC group and MCS; and receiving the packet as one or more repetitions on at least one transmission resource that is dynamically configured from one or more CUEs, together with SCI for configuring one or more of: the redundant version signal information for at least one repetition of the packet, an HARQ ID associated with the packet, diversity scheme, forwarding scheme, TUE ID/designation ID in the UC group and MCS.

In some embodiments, receiving the packet on the at least one configured grant transmission resource comprises receiving, for an nth repetition, an nth signal version, n being previously configured, the nth signal version being modulated and coded using a previously configured modulation and coding scheme (MCS).

In some embodiments, a hybrid automatic repeat request (HARQ) identifier (ID) is determined implicitly based on previously configured transmission resources.

In some embodiments, the method further includes the TUE transmitting a positive or negative acknowledgment of one or more of the repetitions of the packet on the configured grant transmission resource.

In some embodiments, receiving the packet on the at least one configured grant transmission resource, together with SCI, comprises receiving, for an nth repetition, an nth signal version modulated and coded using a modulation and coding scheme (MCS) and having a hybrid automatic repeat request (HARQ) identifier (ID), wherein the value of n, MCS and HARQ ID for the repetition are included in the SCI.

In some embodiments, the method further includes the TUE transmitting a positive or negative acknowledgment of one or more of the repetitions of the packet on configured grant transmission resource.

In some embodiments, receiving the packet on the at least one transmission resource, the packet including SCI, comprises receiving, for an nth repetition, an nth signal version modulated and coded using a modulation and coding scheme (MCS) and having a hybrid automatic repeat request (HARQ) identifier (ID), wherein the value of n, MCS and HARQ ID for the repetition are included in the SCI and wherein the transmission resource has been dynamically configured.

In some embodiments, the method further includes the TUE receiving a positive or negative acknowledgment of one or more of the repetitions of the packet on a transmission resource that has been pre-configured or dynamically configured.

According to a sixth aspect of the disclosure, there is provided a device including a processor and a computer-readable medium having stored thereon computer-implemented instructions. The computer-implemented instructions, when executed by the processor, cause the UE to: receive configuration information comprising an indication of resources for a sidelink (SL) transmission and a redundancy parameter for the SL transmission, the SL transmission for at least one cooperative user equipment (CUE) to forward a packet intended for the device; receive the packet intended for the device, the packet comprising for up to a maximum number of configured repetitions N, n=1 to N, an nth signal version having a respective modulation and coding scheme (MCS); and decode the packet using one or more received repetitions of the packet from one or more CUEs.

In some embodiments, the configuration information includes at least one of: SL transmission resources available to be used by the TUE for receiving packets; an identification of initial or redundant transmission signals associated with the TUE and a number of repetitions; and a diversity scheme to be used for transmission by the TUE.

In some embodiments, the instructions further cause the device to receive the packet by one of: receiving the packet as one or more repetitions on at least one configured grant transmission resource from one or more CUEs; receiving the packet as one or more repetitions on at least one configured grant transmission resource from one or more CUEs, together with sidelink control information (SCI) for configuring one or more of: the redundant version signal information, an HARQ ID associated with the packet, diversity scheme, forwarding scheme, TUE ID/designation ID in the UC group and MCS; and receiving the packet as one or more repetitions on at least one transmission resource that is dynamically configured from one or more CUEs, together with SCI for configuring one or more of: the redundant version signal information, an HARQ ID associated with the packet, diversity scheme, forwarding scheme, TUE ID/designation ID in the UC group and MCS.

In some embodiments, the instructions further cause the device to transmit a positive or negative acknowledgment of one or more of the repetitions of the packet on the configured grant transmission resource.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
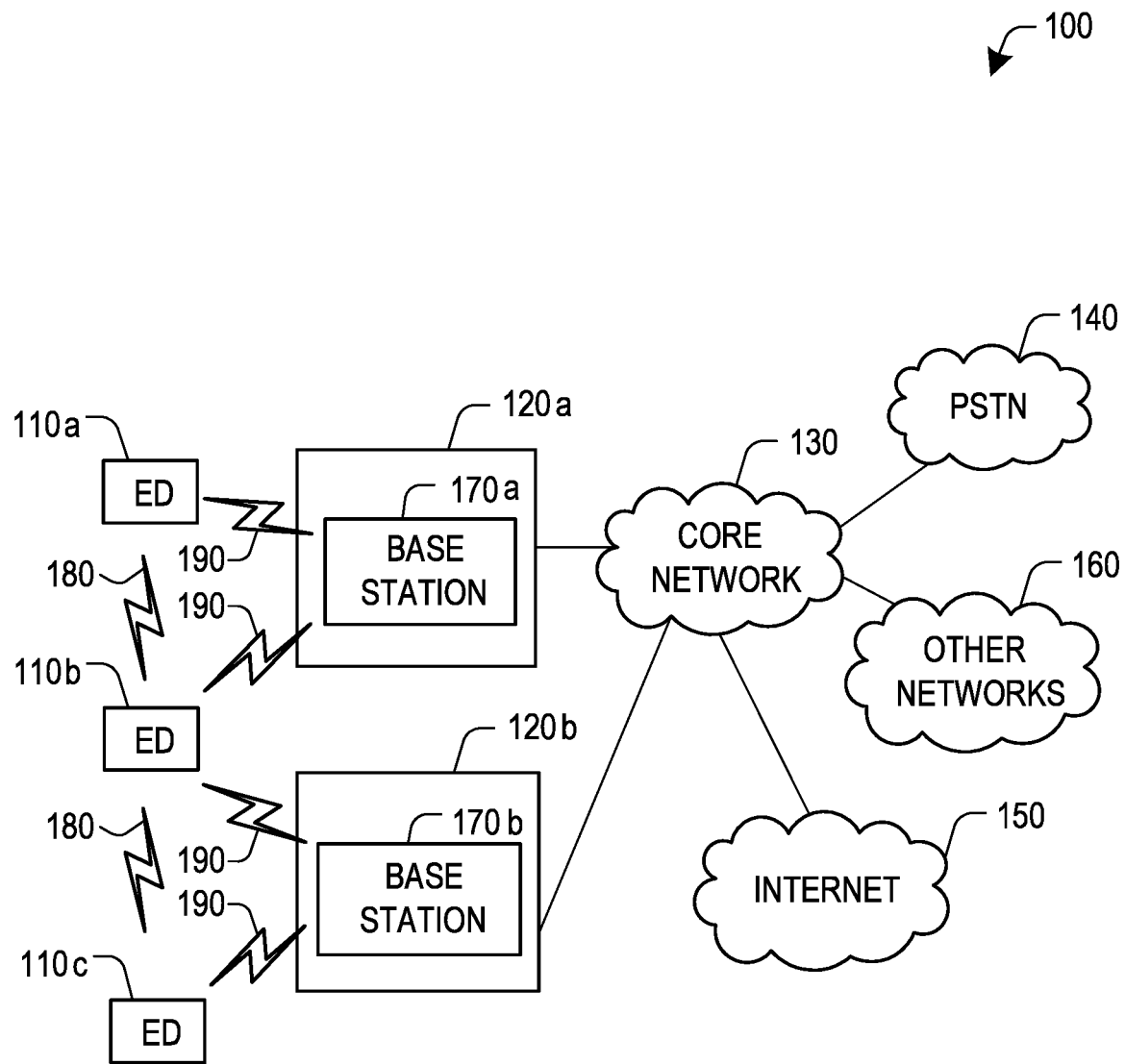
FIG. 1 is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Many applications and services have reliability (and/or latency) requirements, e.g., ultra-reliable low latency communication (URLLC) services for high reliability will need to achieve a successful rate of 99.9999% (and with latency of one or a few ms). UEs in a network can be location anywhere, including the cell edge, but it can be almost impossible for the cell-edge UEs to achieve URLLC high reliability, especially with limited transmission latency, e.g., 1 ms.

UE cooperation can enhance the system by potentially improving coverage and capacity. UE cooperation can also improve the latency and reliability of the system. The UE cooperation can be achieved by a group of UEs helping each other with the Uu interface link transmission and sidelink (SL) transmission. The Uu interface link is the interface that allows data transfer between the base station and a UE. Embodiments of the present disclosure aid in providing coordination and cooperation among UE(s) in the group of UEs in terms of transmission and reception by providing a manner for each transmitted/received message to be identified based on a packet destination identifier and a packet source identifier. The frequency band for transmission between a UE and base station can be different from the frequency band for transmission between users (SL). The frequency band for UL transmission between a UE and base station can be shared or separated from transmissions in sidelink.

A UE in a configured UE group can identify whether it is the destination or target UE or not based on a packet destination identifier. In some embodiments, this may occur without the UE having to decode the entire packet. If the UE is the destination UE, the UE can then decode the entire packet. If the UE is not the destination UE, the UE can forward the packet to the destination UE or a UE in a path to the destination UE or simply other UE in the UE group. In some embodiments, once the destination UE has received and decoded the packet, the destination UE can send a hybrid automatic repeat request acknowledgement (HARQ-ACK) back to the source acknowledging the packet has been received. The destination UE may send the HARQ-ACK to the source directly, or through one or more UEs in the group to the source.

FIGS. 1, 2A, 2B and 3 following below provide context for the network and device that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b* communicate with one or more of the EDs 110*a*-110*c* over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using wideband CDMA (WCDMA). In doing so, the base station 170*a*-170*b* may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170*a*-170*b* may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160).

The EDs 110*a*-110*c* communicate with one another over one or more SL air interfaces 180 using wireless communication links e.g. radio frequency (RF), microwave, infrared (IR), etc.. The SL air interfaces 180 may utilize any suitable radio access technology, and may be substantially similar to the air interfaces 190 over which the EDs 110*a*-110*c* communication with one or more of the base stations 170*a*-170*c*, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. Various methods may be used to provide the configuration parameters and control information necessary for enabling configured grant transmissions in SL. The various methods will, however, each incur a respective overhead penalty. Embodiments of the present disclosure comprise including at least some of those configuration parameters and/or control information in the SL configured grant transmission, which may provide performance and/or overhead benefits.

In addition, some or all of the EDs 110*a*-110*c* may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110*a*-110*c* may be multimode devices capable of operation according to multiple radio access technologies, and incorporate multiple transceivers necessary to support multiple radio access technologies.

Figure 2A:
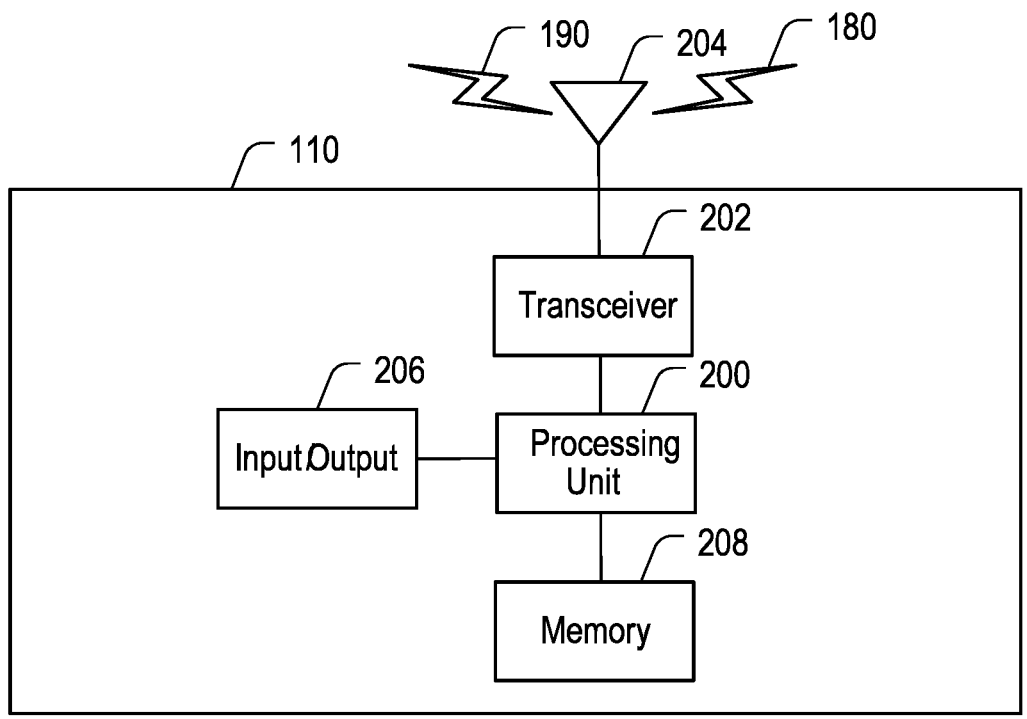
FIGS. 2A and 2B are block diagrams of an example user equipment and base station, respectively.
Figure 2B:
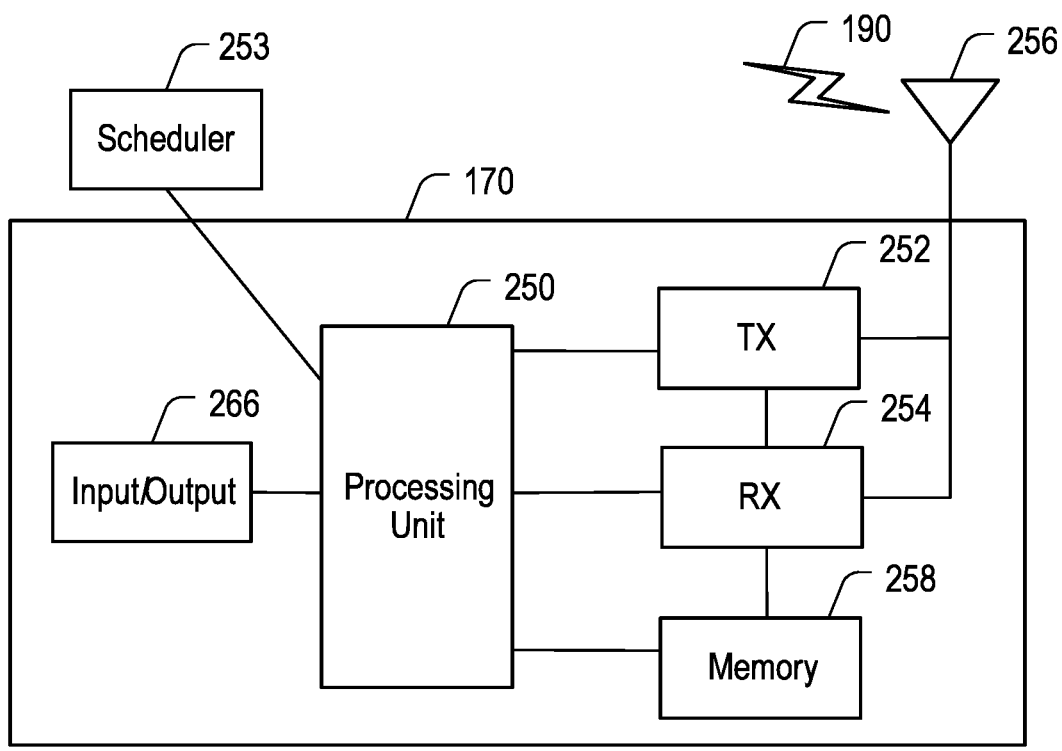

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170.

For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 3:
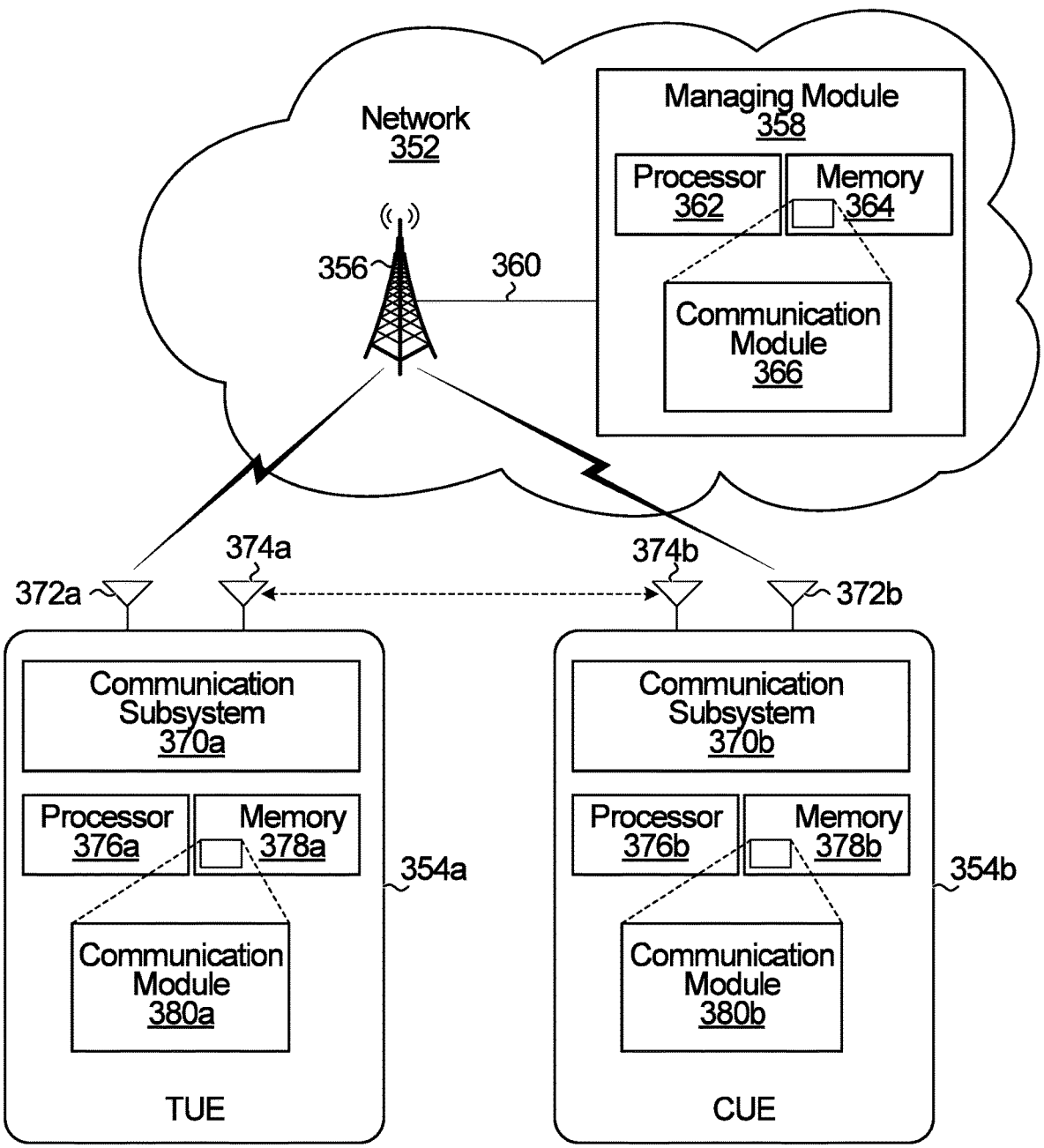
FIG. 3 is a block diagram illustrating an example of a network serving two UEs according to an aspect of the present disclosure.

FIG. 3 is a block diagram illustrating an example of a network 352 serving two UEs 354a and 354b, according to one embodiment. The two UEs 354a and 354b may be, for example, the two UEs 110a and 100b in FIG. 1. However, more generally this need not be the case, which is why different reference numerals are used in FIG. 3.

The network 352 includes a BS 356 and a managing module 358. The managing module 358 instructs the BS 356 to perform actions. The managing module 358 is illustrated as physically separate from the BS 356 and coupled to the BS 356 via a communication link 360. For example, the managing module 358 may be part of a server in the network 352. Alternatively, the managing module 358 may be part of the BS 356.

The managing module 358 includes a processor 362, a memory 364, and a communication module 366. The communication module 366 is implemented by the processor 362 when the processor 362 accesses and executes a series of instructions stored in the memory 364, the instructions defining the actions of the communication module 366. When the instructions are executed, the communication module 366 causes the BS 356 to perform the actions described herein so that the network 352 can establish, coordinate, instruct, and/or control a UE group. Alternatively, the communication module 366 may be implemented using dedicated circuitry, such as an application specific integrated circuit (ASIC) or a programmed field programmable gate array (FPGA).

The UE 354a includes a communication subsystem 370a, two antennas 372a and 374a, a processor 376a, and a memory 378a. The UE 354a also includes a communication module 380a. The communication module 380a is implemented by the processor 376a when the processor 376a accesses and executes a series of instructions stored in the memory 378a, the instructions defining the actions of the communication module 380a. When the instructions are executed, the communication module 380a causes the UE 354a to perform the actions described herein in relation to establishing and participating in a UE group. Alternatively, the module 380a may be implemented by dedicated circuitry, such as an ASIC or an FPGA.

The communication subsystem 370a includes processing and transmit/receive circuitry for sending messages from and receiving messages at the UE 354a. Although one communication subsystem 370a is illustrated, the communication subsystem 370a may be multiple communication subsystems. Antenna 372a transmits wireless communication signals to, and receives wireless communications signals from, the BS 356. Antenna 374a transmits SL communication signals to, and receives SL communication signals from, other UEs, including UE 354b. In some implementations there may not be two separate antennas 372a and 374a. A single antenna may be used. Alternatively, there may be several antennas, but not separated into antennas dedicated only to SL communication and antennas dedicated only to communicating with the BS 356.

SL communications could be over Wi-Fi, in which case the antenna 374a may be a Wi-Fi antenna. Alternatively, the SL communications could be over Bluetooth™, in which case the antenna 374a may be a Bluetooth™ antenna. SL communications could also or instead be over licensed or unlicensed spectrum. [ono] The UE 354b includes the same components described above with respect to the UE 354a. That is, UE 354b includes communication subsystem 370b, antennas 372b and 374b, processor 376b, memory 378b, and communication module 380b.

The UE 354a is designated as a target UE (TUE) and will therefore be called TUE 354a. The UE 354b is a cooperating UE and will therefore be called CUE 354b. The CUE 354b may be able to assist with wireless communications between the BS 356 and TUE 354a if a UE group were to be established that included TUE 354a and CUE 354b.

UE 354a may be specifically chosen as the target UE by the network 352. Alternatively, the UE 354a may itself determine that it wants to be a target UE and inform the network 352 by sending a message to the BS 356. Example reasons why UE 354a may choose or be selected by the network 352 to be a target UE include: low wireless channel quality between the UE 354a and the BS 356, many packets to be communicated between the BS 356 and the UE 354a, and/or the presence of a cooperating UE that is a good candidate for helping with communications between the BS 356 and the UE 354a.

UE 354a need not always stay a target UE. For example, UE 354a may lose its status as a target UE once there is no longer a need or desire for assistance with wireless communications between UE 354a and the BS 356. UE 354a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 354a acts only as a target UE, i.e., TUE 354a, and the UE 354b is a cooperating UE to the TUE 354a, i.e., CUE 354b.

FIG. 3 illustrates a system in which embodiments could be implemented. In some embodiments, a UE includes a processor, such as 376a, 376b in FIG. 3, and a non-transitory computer readable storage medium, such as 378a, 378b in FIG. 3, storing programming for execution by the processor. A non-transitory computer readable storage medium could also or instead be provided separately, as a computer program product.

In such embodiments, programming could include instructions to: receive, by the UE, a packet comprising a UE group identifier and further comprising a packet destination identifier that identifies a destination UE and determining, by the UE, if the UE is the destination UE. When the UE is the destination UE, the UE decoding the packet and when the UE is not the destination UE, the UE forwarding the packet to another UE.

For UEs close to a cell edge or experiencing otherwise poor channel conditions, their performance can be enhanced via a help from other UEs that have a relatively better channel conditions in terms of spectrum efficiency or transmission coverage.

Cooperative UEs (CUEs) in the network that have better transmission coverage can help target UEs (TUEs) for both downlink (DL) and uplink (UL) transmissions. DL and UL transmission here are intended to include transmissions from the base station to the TUE and the TUE to the base station, respectively, even if the path from one point to the other includes one or more CUE. One or more CUEs in the path are able to provide natural spatial diversity and redundant signals to the TUE. The TUE and nearby CUEs can form a helping group for UE cooperation. There may be only one TUE or multiple TUEs in a UE group.

Figure 4:
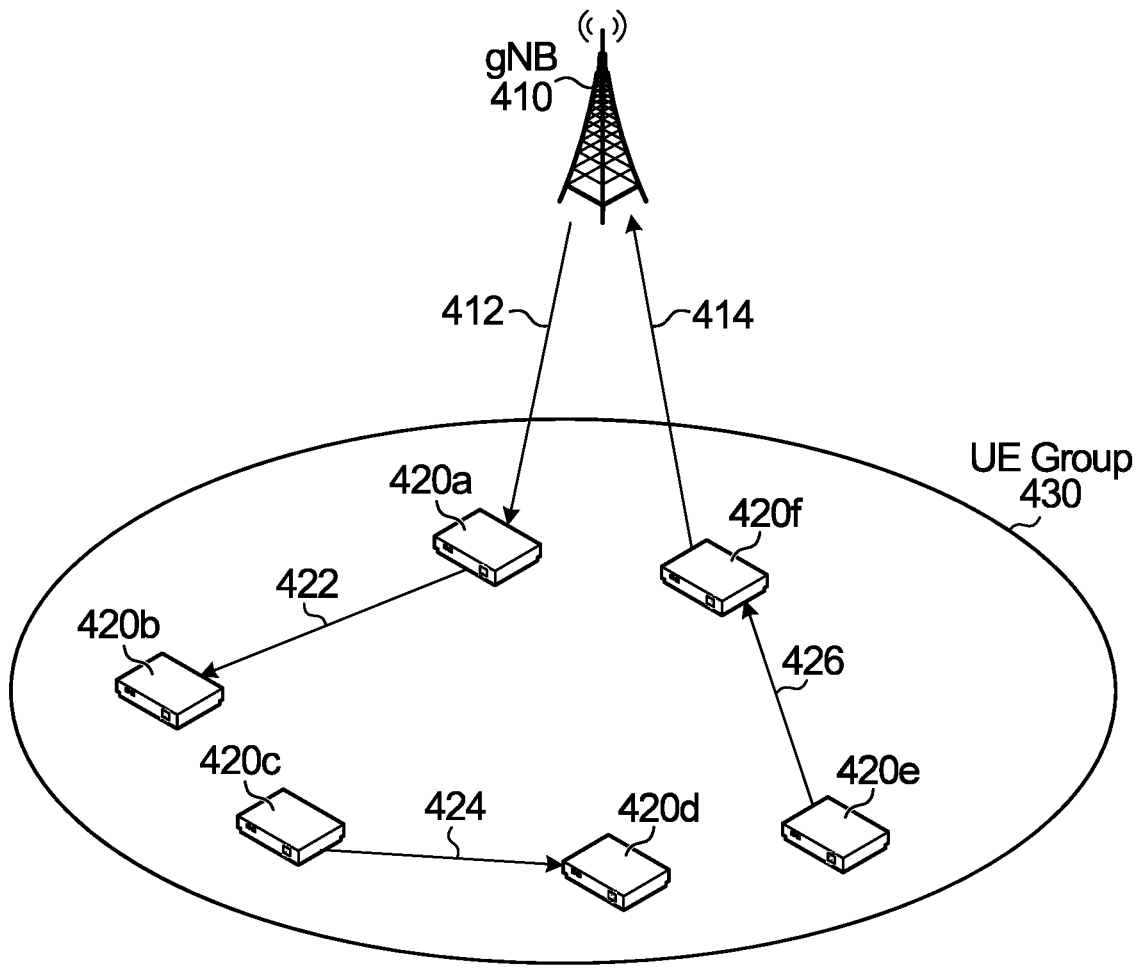
FIG. 4 is a schematic diagram of communications between a base station and multiple user equipment in a UE group according to an embodiment of the present disclosure.

FIG. 4 illustrates three different types of packet transmissions that may occur between a base station and a group of UEs that are predefined as being in a same group. FIG. 4 includes a base station (gNB) 410 and several UEs (420a, 420b, 420c, 420d, 420e and 420f) that are part of UE group 430. The base station 410 can transmit and receive from UEs, for example as indicated by Uu downlink (DL) transmission 412 to UE 420a and by Uu uplink (UL) transmission 414 from UE 420f. The UEs can transmit and received amongst themselves as indicated by sidelink (SL) transmission 422 between UE 420a and UE 420b, by SL transmission 424 between UE 420c and UE 420d and by SL transmission 426 between UE 420e and UE 420f.

Type #1: The Transmission is Between a Base Station and a UE in a Predefined UE Group The base station sends a packet in Uu DL by multicasting to a group of UEs. The cyclic redundancy code (CRC) of the packet can be scrambled by a target UE (TUE) ID or a group UE ID that is used to identify UEs in the predefined group of UEs. The TUE ID would typically by considered a type of global identifier of the UE that is the target destination of the packet. An example of this is a Radio Network Temporary Identifier (RNTI). The RNTI is a 16-bit long identifier that is assigned by the base station regardless of whether the UE is performing UE cooperation or not. The RNTI can be used to scramble the CRC and decode information bits of the packet for the TUE. The UEs in the group could receive the packet and identify a destination for the packet, i.e. the destination UE. If the packet is not for the UE, the UE can forward the packet through amplify and forward (AF) or decode and forward (DF) methods. In some embodiments, the packet is forwarded using grant free (GF) transmission, also known as configured grant transmission. If a UE receives and identifies the package is for itself, the UE can decode the packet. The target UE (TUE) can identify a source of the packet and send a Hybrid-Automatic Repeat Request (HARQ) acknowledgement (ACK) to the source, either directly or via one or more CUE.

Type #2: The Transmission is Between UEs within the UE Group

The UE(s) in the UE group can send a packet using SL to another UE. In some embodiments this may include using a configured grant transmission. The CRC of the packet can be scrambled by a target UE (TUE) ID or the group UE ID. The UEs in the UE group can receive the packet and identify a destination for the packet. If the packet is not for the UE, the UE can forward the packet through AF or DF methods. In some embodiments, the packet is forwarded using configured grant transmission. If the UE receives and identifies the packet is for itself, the UE can decode the packet. The TUE can identify a source of the packet and send a HARQ ACK to the source, either directly or via one or more CUE.

Type #3: The transmission is from a UE in a predefined UE group to a base station If the UE knows, or can determine, that the UE is within the coverage area of Uu UL, the UE can send the packet directly to the base station using Uu UL. In some embodiments, the packet is transmitted using configured grant transmission. If the UE in the UE group knows, or can determine, that the UE is not within the coverage area of Uu UL, the UE sends the packet using SL to one or more UEs. In some embodiments, the packet is transmitted using configured grant transmission. The CRC of the packet can be scrambled by the TUE ID, or the group UE ID. The UEs in the UE group can receive the packet and identify a destination for the packet. If the packet is not for the UE, the UE in the UE group can forward the packet through AF or DF methods. In some embodiments, the packet is forwarded using configured grant transmission. If the UE receives and identifies the packet is for the base station, and the UE is within the coverage area of Uu UL, the UE can transmit the packet directly to the base station using Uu UL. In some embodiments, the packet is transmitted using configured grant transmission.

The packets in these types of transmissions could carry one or a combination of data and control information from lower or higher layers.

To make the UE cooperation (UC) operational, UEs in vicinity will need to form a UE cooperation group and the UE cooperation will involve both transmissions between base station (Uu link) and UEs and sidelink (SL) transmissions.

In embodiments of this disclosure, UE cooperation involves the CUEs forwarding or relaying traffic to or from one or more TUEs. In some implementations, this may include with redundant signal transmissions or receptions. In order for redundant signal transmissions to be combined or detected more efficiently, redundant signals transmitted or received by each UE (CUE or TUE) have to be configured such that the redundant version signals are transmitted or received in a cooperative way. Redundant version signals from each CUE (or TUE) and from different transmission time intervals must be clearly defined or indicated, for example, by SL control signaling or SL control information, SCI, in a format such as SCI format 0-1 or SCI format 0-2 in 5G/NR specifications. In the case of downlink from base station to a target UE, even if one CUE from a group of helping UEs is not able to forward the traffic due to not being able to successfully detect traffic towards the TUE(s), the redundant version signals from other UEs can still be efficiently and jointly detected at the TUE(s), where, for example, a redundant version for initial transmission and a redundant transmission for each CUE may be used such that the initial transmission with the redundant version can be self-decodable and a redundant version for each transmission can be pre-configured or dynamically indicated by SL SCI in a format such as SCI 0-2. The redundant version signals from one or more UEs can be repeated if a NACK is received from the reception end. When the capability of multiple repetitions of a packet transmission from one or more UEs is configured, the repetition transmissions of the packet can be terminated timely by an ACK from the reception end, for example, to avoid unnecessary interference to the system.

Towards this end, configuration and signaling mechanisms are described herein to make the UE cooperation perform smoothly and effectively. In the Uu link, the base station will need to configure UEs in a UE group, which may include one or more of: a configuration of the transmission and receiving resources, configuration of redundant signal versions (such as chase combining or incremental redundancy), configuration of a transmission diversity scheme (such as a cyclic delay diversity or Alamouti encoding), configuration of a forwarding scheme (such as decode and forward) for a UE in the UC group, and an indication of whether to use unicast, group-cast or broadcast in transmissions of a TUE (TUEs) packet upon its arrival to the UC group from a base station.

In UC SL for a downlink transmission, one or more CUEs receive/detect a packet transmitted on a Uu link, the CUE or CUEs who correctly receive the packet and have been configured as helping UEs will forward/send information in the packet to the associated TUE(s). Each CUE is configured with redundant version signals of the packet. The configuring may be pre-configuration, semi-statically configuring, or dynamically configuring such as SCI signaling in each SL transmission. The CUEs forward redundant signal versions of the packet in dedicated resources or shared resources with same or different HARQ IDs to a TUE. In one embodiment, the CUEs forward redundant version signals/transmissions of the packet, each in CUE dedicated resources, with a single HARQ ID (associated with the packet), for all CUE transmissions to the TUE, where one or more of: the redundant version signal information, the HARQ ID, diversity scheme, forwarding scheme, TUE ID/designation ID in the UC group and MCS may be indicated (or dynamically configured) by SCI together with each transmission. In another embodiment, the CUEs forward redundant version signals/transmissions of the packet, each in CUE dedicated resources, with a different HARQ ID, to the TUE where these different HARQ IDs from different CUE transmissions are associated with the packet, and one or more of: the redundant version signal information, an HARQ ID, diversity scheme, forwarding scheme, TUE ID/designation ID in the UC group and MCS may be indicated (or dynamically configured) by SCI together with each transmission from a CUE. The resource may be configured by pre-configuration, semi-statically configuring, or dynamically configuring (or indicating). The CUEs that are not able to correctly detect a packet in a transmission time interval (TTI) will not forward anything.

A redundant signal version can use chase combining (CC) or incremental redundancy (IR). A transmission diversity scheme can be a cyclic delay diversity (CDD) version or an Alamouti encoding. A forwarding scheme can be any one of amplify and forward (AF), decode and forward (DF), compress and forward (CF), quantization and forward (QF), etc. These transmission parameters including the redundant version, diversity and forwarding schemes can be pre-configured, semi-statically configure or dynamically configured, for example in some embodiments using sidelink control information (SCI) signaling for example, in a way of SCI 0-1 or/and SCI 0-2 format.

Meanwhile, the one or more TUEs can receive and detect the signal directly received over the Uu link (if possible), as well as the redundant version signals from CUE(s). Once detected, the TUE(S) may provide feedback to CUE(s) or a base station accordingly based on a feedback channel or time-frequency resource configuration from a base station or a designated UE such as CUE.

In UC SL for an upward (from a TUE to base station or network) transmission, one (or more TUEs) can forward its (or their) packet(s) to one or more CUEs, and the CUE(s) will then forward upward to the base station.

FIGS. 5A, 5B, 5C, and 5D provide additional examples of UE cooperation in which various combinations of unicast and multicast transmissions occur between a base station, one or more cooperating UEs and one or more target UEs.

Each of the four examples includes a base station (gNB) transmitting to and receiving from up to four cooperating UEs ($CUE_1$, $CUE_2$, $CUE_3$, and $CUE_4$) on a Uu link. The up to four cooperating UEs ($CUE_1$, $CUE_2$, $CUE_3$, and $CUE_4$)

are transmitting to and receiving from up to two target UEs on a sidelink (SL) link (TUE$_5$, TUE$_6$).

Figure 5A:
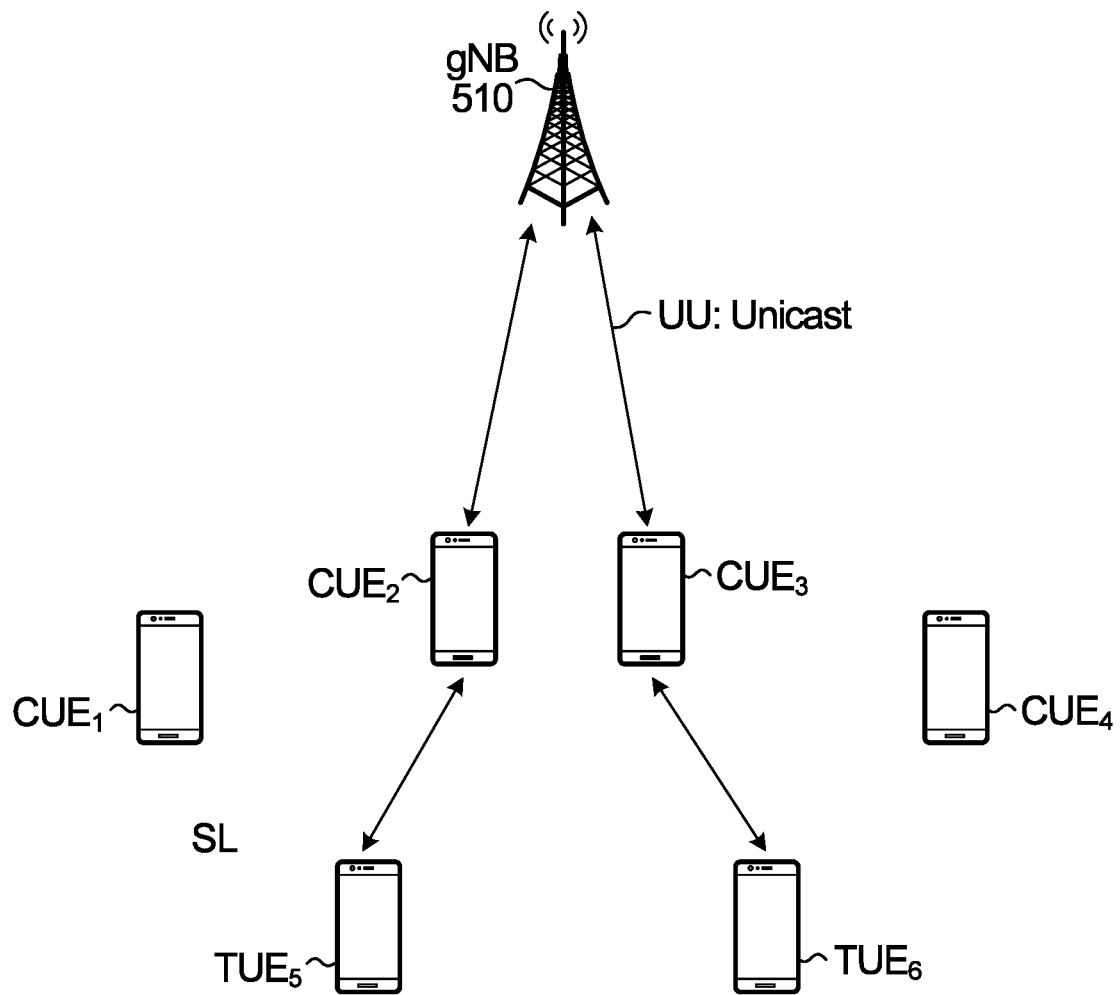
FIGS. 5A, 5B, 5C and 5D are examples of four different arrangements of unicast and multicast transmissions on Uu links and sidelinks (SLs), according to embodiments of the present disclosure.

In FIG. 5A, as part of a configuration process, the base station (gNB) 510 notifies CUE$_2$ that CUE$_2$ is to aid forwarding packets to TUE$_5$ and CUEs is notified that it is to aid forwarding packets to TUE$_6$. Then when the gNB 510 forwards packets by unicast intended for TUE$_5$ on the Uu link, CUE$_2$ receives the packets and forwards them to TUE$_5$ on the SL and when the gNB 510 forwards packets by unicast intended for TUE$_6$ on the Uu link, CUE$_3$ receives the packets and forwards them to TUE$_6$ on the SL. In some embodiments, TUE$_5$ or TUE$_6$ can also receive the signals directly from the gNB 510 transmitting the packets. In such a situation, the TUE can then combine received signals directly from the gNB 510 with signals received from one of the CUEs. As CUE$_2$ and CUEs are each only configured to aid a single TUE in this example, the SL transmissions use unicast to transmit to each TUE, respectively. The CUE-TUE relationship is fixed for at least a given time period by configuration or until otherwise changed by a new configuration by the gNB 510. In some embodiments, CUE$_2$ and CUE$_3$ are each preconfigured to transmit using one or more repetitions, each with redundant versions. Each initial transmission or repetition has an associated HARQ ID to allow the receiving UE to identify the particular transmission amongst other transmissions. The configuration on the number of repetitions, redundant versions and HARQ ID can be pre-configured, semi-statically configured or dynamically configured, as will be described in further detail below. SL transmission occasions (TOs) can be configured as configured grant (CG) transmissions or dynamically indicated, e.g., using sidelink control information (SCI).

Figure 5B:
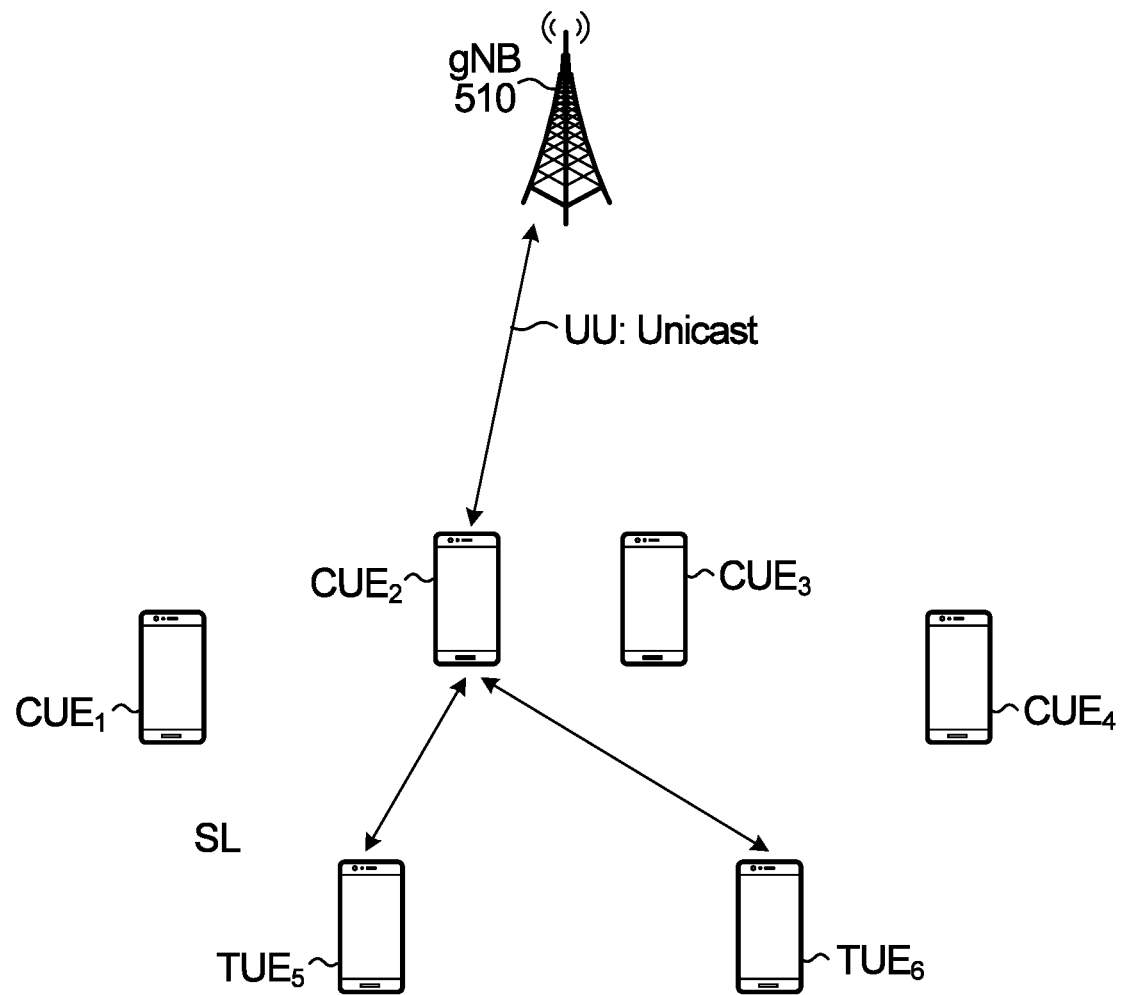

In FIG. 5B, as part of a configuration process, the gNB 510 notifies CUE$_2$ that CUE$_2$ is to aid forwarding packets to TUE$_5$ and TUE$_6$. Then when the gNB 510 forwards packets by unicast intended for TUE$_5$ or TUE$_6$ on the Uu link, CUE$_2$ receives the packets and forwards them to TUE$_5$ and TUE$_6$ on the SL link. TUE$_5$ and TUE$_6$ will both decode the received signals and only the TUE that the packets are targeted for will correctly detect the packets. In some embodiments, TUE$_5$ or TUE$_6$ will also receive the signals directly from the gNB 510 transmitting the packets. In such a situation, the TUE can then combine received signals directly from the gNB 510 with signals received from one of the CUEs. As CUE$_2$ is configured to aid both TUE$_5$ and TUE$_6$ in this example, the SL transmissions may be multi-cast or group-cast to transmit to both TUE$_5$ and TUE$_6$. The CUE-TUE relationship is fixed for at least a given time period by configuration or until otherwise changed by a new configuration by the gNB 510. In some embodiments, CUE$_2$ is preconfigured to transmit using one or more repetitions, each with redundant versions. Each transmission has an associated HARQ ID. The configuration on the number of repetitions, redundant versions and HARQ ID can be pre-configured, semi-statically configured or dynamically configured, as will be described in further detail below. SL group-cast TOs can be configured as configured grant (CG) transmissions or dynamically indicated, e.g., using SCI.

Figure 5C:
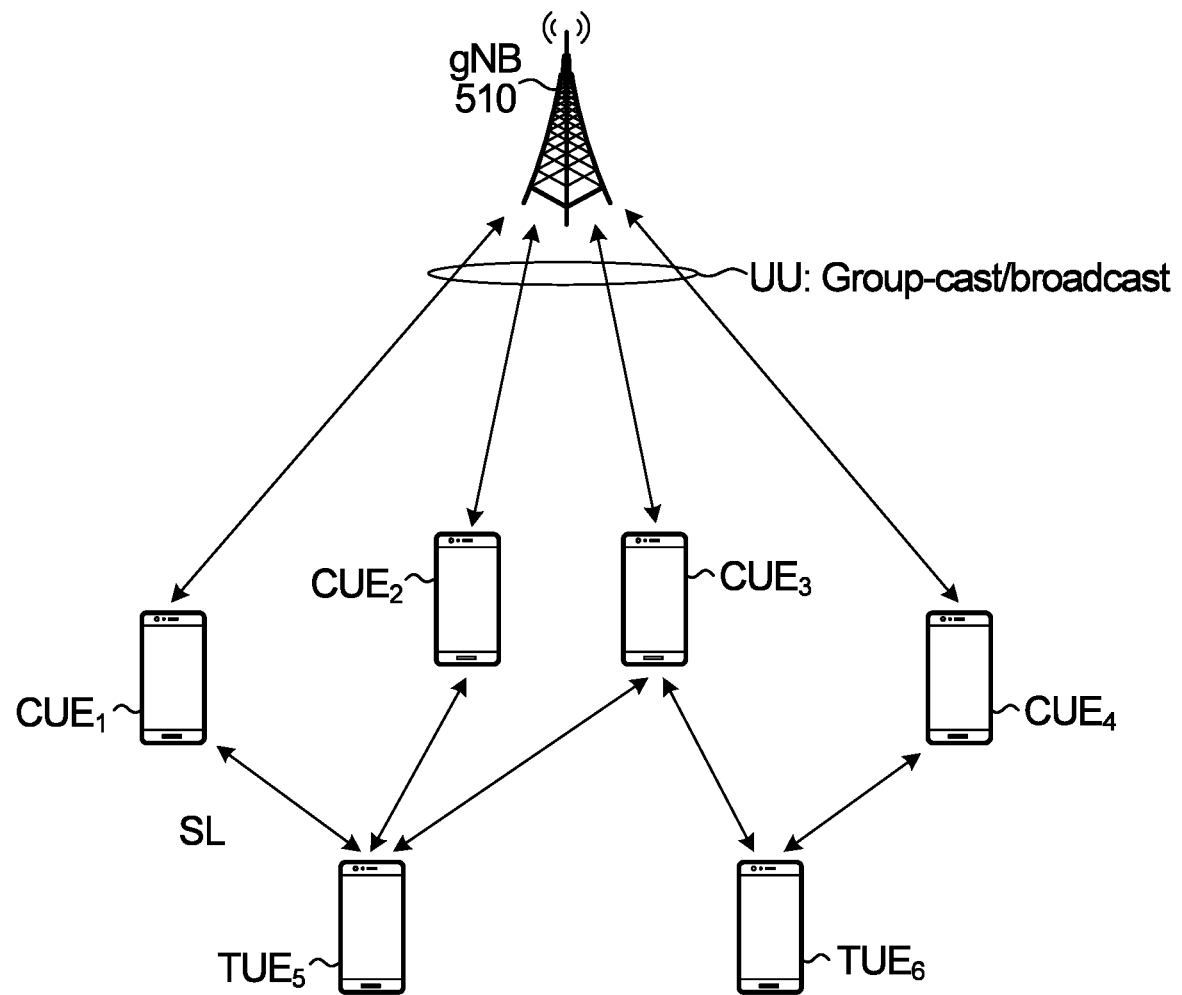

In FIG. 5C, as part of a configuration process, the gNB 510 notifies CUE$_1$ that CUE$_1$ is to aid forwarding packets to TUE$_5$, gNB 510 notifies CUE$_2$ that CUE$_2$ is to aid forwarding packets to TUE$_5$, gNB 510 notifies CUE$_3$ that CUE$_3$ is to aid forwarding packets to TUE$_5$ and TUE$_6$, and gNB 510 notifies CUE$_4$ that CUE$_4$ is to aid forwarding packets to TUE$_6$. Then when the gNB 510 forwards packets by group-cast or broadcast intended for TUE$_5$ or TUE$_6$ on the Uu link, CUE$_1$, CUE$_2$, CUE$_3$ and CUE$_4$ receive the packets and whichever of the CUEs is able to correctly decode the packets forwards the packets to TUE$_5$ or TUE$_6$ on the SL link. As CUE$_1$, CUE$_2$ and CUE$_4$ are each only configured to aid a single TUE in this example, the SL transmissions use unicast to transmit to the TUEs they are respectively configured to aid. As CUE$_3$ is configured to aid both TUE$_5$ and TUE$_6$ in this example, the SL transmissions may be multi-cast or group-cast to transmit to both TUE$_5$ and TUE$_6$; alternatively, it is possible here for CUE$_3$ to use unicast transmission to TUE$_5$ and TUE$_6$, respectively. The packets received at the TUEs from the CUEs can be from a single CUE or combined from multiple CUEs as appropriate. The CUE-TUE relationship is fixed for at least a given time period by configuration or until otherwise changed by a new configuration by the gNB. In some embodiments, the CUEs are preconfigured to transmit using one or more repetitions, each with redundant versions. Each transmission has an associated HARQ ID. The configuration on the number of repetitions, redundant versions and HARQ ID can be pre-configured, semi-statically configured or dynamically configured, as will be described in further detail below. A redundant signal version can utilize chase combining (CC) HARQ or incremental redundancy (IR) HARQ. The redundant signal version may not utilize a transmission diversity scheme for a scenario of one CUE to one TUE helping relationship or may utilize a transmission diversity scheme for a scenario of more than one CUE to one or more TUEs helping relationship, with CUEs forwarding in orthogonal time or frequency resources. The redundant signal version may utilize a cyclic delay diversity (CDD) or an Alamouti encoding for a scenario of more than one CUE to one or more TUEs helping relationship with CUEs simultaneously forwarding in the same time-frequency resources. The packet transmission is also associated with a forwarding scheme (e.g., amplify and forward (AF), decode and forward (DF), compress and forward (CF), etc.). The above configuration on these parameters can be pre-configured, semi-statically or dynamically configured (e.g., SCI). SL transmission occasions (TOs) can be pre-configured or semi-statically as CG transmissions or dynamically indicated, e.g., using SCI for multiple CUEs to transmit. In some embodiments, TUE$_5$ or TUE$_6$ can also receive the signals directly from the gNB 510 transmitting the packets. In such a situation, the TUE can then combine received signals directly from the gNB 510 with signals received from one of the CUEs as appropriate.

Figure 5D:
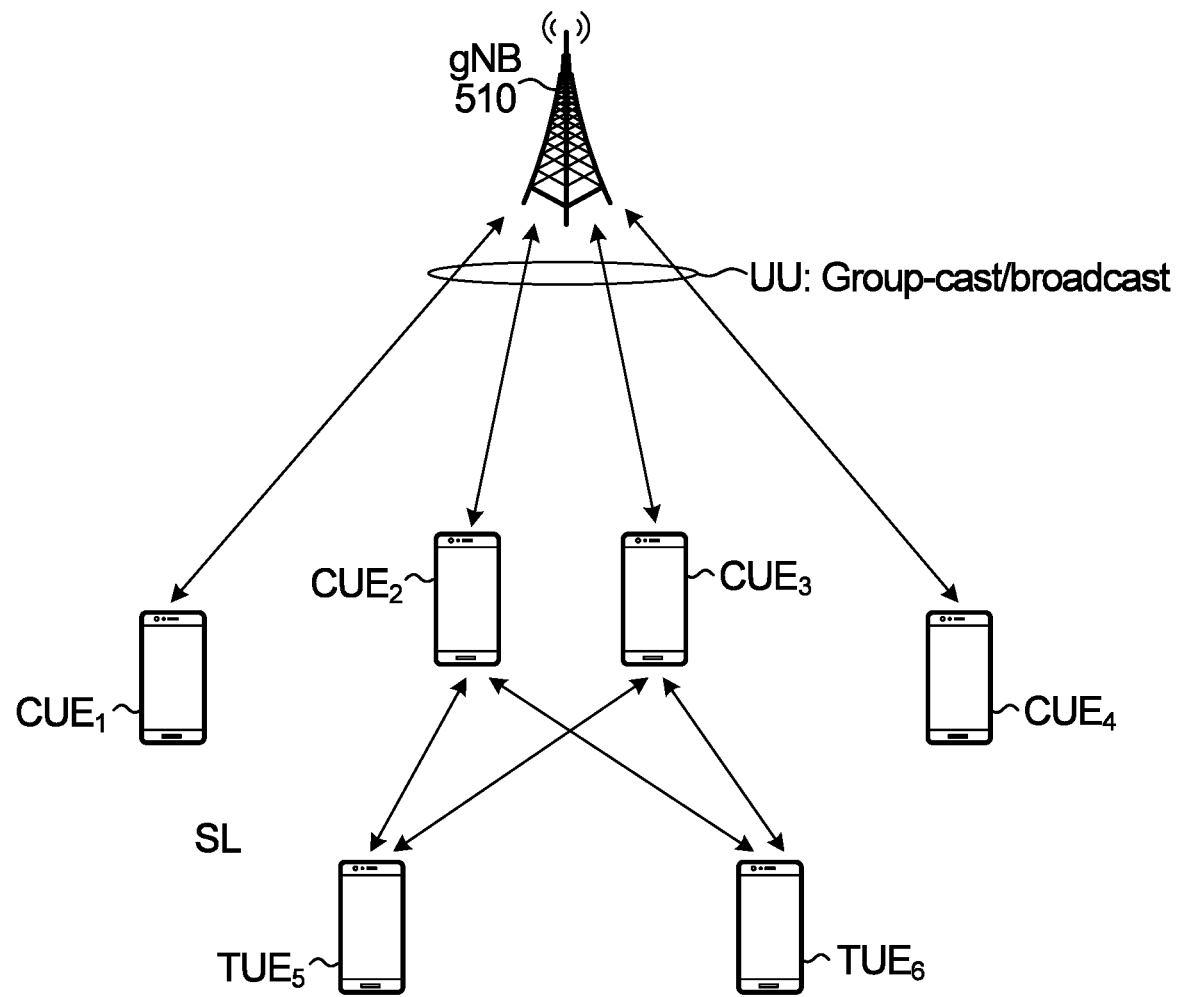

In FIG. 5D, as part of a configuration process, the gNB 510 notifies CUE$_2$ that CUE$_2$ is to aid forwarding packets to TUE$_5$ and TUE$_6$ and gNB 510 notifies CUE$_3$ that CUE$_3$ is to aid forwarding packets to TUE$_5$ and TUE$_6$. Then when the gNB 510 forwards packets by group-cast or broadcast intended for TUE$_5$ or TUE$_6$ on the Uu link CUE$_2$ and CUE$_3$ receive the packets and forward them to TUE$_5$ or TUE$_6$ on the SL link. As CUE$_2$ and CUE$_3$ are configured to aid both TUE$_5$ and TUE$_6$ in this example, the SL transmissions may be multi-cast or group-cast to transmit to both TUE$_5$ and TUE$_6$. In this example CUE$_1$ and CUE$_4$ are not configured to help in forwarding packets to any particular TUE. Therefore, CUE$_1$ and CUE$_4$ do not forward the packets, even though they are received due to the multi-cast by the gNB 510. The packets received at the TUEs from the CUEs can be from a single CUE or combined from multiple CUEs as appropriate. The CUE-TUE relationship is fixed for at least a given time period or until otherwise changed by a new configuration by the gNB 510. In some embodiments, the CUEs are preconfigured to transmit using one or more repetitions, each with redundant versions. Each transmission has an associated HARQ ID. The configuration on the number of repetitions, redundant versions and HARQ ID can be pre-configured, semi-statically configured or dynamically configured, as will be described in further detail below. A redundant signal version can utilize CC HARQ or IR HARQ. The redundant signal version may not utilize a transmission diversity scheme for a scenario of one CUE to one TUE helping relationship or may utilize a transmission diversity scheme for a scenario of more than one CUE to one or more TUEs helping relationship, with CUEs forwarding in orthogonal time or frequency resources. The redundant signal version may utilize a cyclic delay diversity (CDD) or an Alamouti encoding for a scenario of more than one CUE to one or more TUEs helping relationship with CUEs simultaneously forwarding in the same time-frequency resources. The packet transmission is also associated with a forwarding scheme (e.g., AF, DF, CF, etc.). SL TOs can be pre-configured or semi-statically as configured grant (CG) transmissions or dynamically indicated, e.g., using SCI for multiple CUEs to transmit. In some embodiments, $TUE_5$ or $TUE_6$ can also receive the signals directly from the gNB 510 transmitting the packets. In such a situation, the TUE can then combine received signals directly from the gNB 510 with signals received from one of the CUEs.

In some embodiments for FIG. 5A, 5B, 5C or 5D, the gNB can forward one packet by unicast, group-cast or broadcast intended for $TUE_5$ and $TUE_6$. FIGS. 5A, 5B, 5C and 5D each have only four UEs as CUEs and two UEs as TUEs, but it is to be understood that these are intended to be non-limiting examples. The number of UEs in a UE group, the number of CUEs in the UE group and the number of TUEs in the UE group, which UEs in the UE group are designated to help particular TUEs, etc., are all implementation specific variables.

Figure 6:
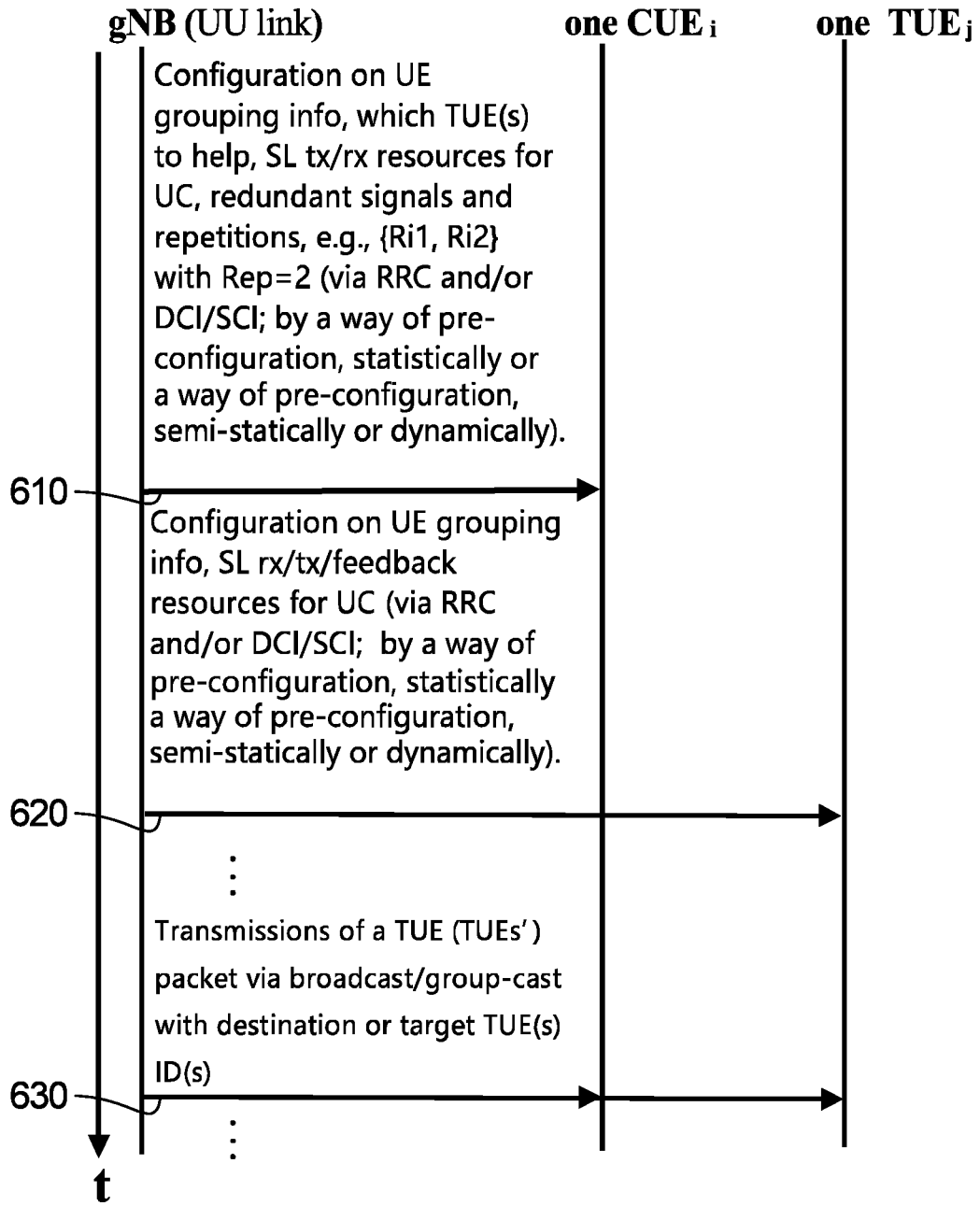
FIG. 6 is a signaling diagram showing an example of how a base station may send configuration information to cooperating UEs (CUEs) and target UEs (TUEs) according to an embodiment of the present disclosure.

FIG. 6 illustrates an example of signaling that may occur between a base station and multiple UEs that have been identified as a cooperation group by the base station. Some of the multiple UEs are identified as TUEs and other of the multiple UEs are identified as CUEs, of which one or more may be configured to aid in transmitting a packet to which target UEs and to share some information of the target UEs such as a target UE ID and/or its scrambling ID. The vertical axis is a temporal axis and generally notes a passage of time. However, it is not intended that the signal messaging necessarily occurs in the exact order shown. Configuration to particular UEs may occur sequentially or simultaneously. Signaling that may occur between the base station and one or multiple UEs in FIG. 6 includes UE resource configuration (or group-based resource allocation), UE cooperation (UC) grouping information (such as group ID, optionally a sub-group ID for one UE in the group, etc.), and associated parameters including, for example, redundant signal versions. The base station performs a UE-specific configuration including the UE UC grouping information.

At a first instance 610, the base station sends configuration information to one or more cooperating UEs that includes one or more of: information to notify one or more CUEs which one or more TUEs to aid in forwarding packets intended for the one or more TUEs; information to identify sidelink (SL) transmission and receiving resources that can be used for the group of UEs; information to identify redundant signals and repetitions, e.g., {Ri1, Ri2} with Rep=2; information to identify a diversity scheme (e.g., CDD, Alamouti) if applicable (e.g., one CUE to one TUE helping relationship would not necessarily need a diversity scheme identification); and information to identify a forwarding scheme (e.g., amplify and forward, decode and forward, compress and forward). The configuration information can be sent via radio resource control (RRC) messaging or downlink control information (DCI) or sidelink control information (SCI), or some combination thereof. The configuration information can be pre-configured, semi-statically configured or dynamically configured.

At a second instance 620, the base station sends configuration information to one or more target UEs that includes one or more of: information to identify sidelink (SL) transmission and receiving resources that can be used for the TUE(s), information to identify a diversity scheme (e.g, CDD, Alamouti), if applicable (e.g., one CUE to one TUE helping relationship would not necessarily need a diversity scheme identification); and optionally, information to identify a forwarding scheme (e.g., amplify and forward, decode and forward, compress and forward). The configuration information can be sent via radio resource control (RRC) messaging or downlink control information (DCI) or sidelink control information (SCI), or some combination thereof. The configuration information can be pre-configured, semi-statically configured or dynamically configured.

Configuration of additional UEs can occur in the same way.

In some embodiments, the common parameters being sent to a UC grouping can be configured in a group-cast or broadcast signaling message, separate from UE specific configuration signaling messages. When the base station is ready to send packets at another instance 630, the base station can transmit packets via unicast or broadcast/group-cast signaling, as described in the example of FIGS. 5A, 5B, 5C and 5D above, with a destination or TUE identifier (ID) indicated in the transmission. The TUE ID may be included in a DCI or uplink control information (UCI) multiplexed with data; alternatively, the TUE ID may be included in MAC CE or even in a higher layer entity such as packet data convergence protocol (PDCP), Radio Link Control (RLC), or/and Internet Protocol (IP) layer. Usually, different types of relay devices may carry a designation ID in different protocol entities; for example, Layer 2 (L2) relay may include a target UE ID or destination ID in a PDCP/RLC layer while Layer 3 (L3) relay may include a target UE ID or destination ID in an IP layer. For a UC group where one or more CUEs are to help forward the received traffic intended for (or from) a TUE, each of the CUEs may get or know from the received traffic the TUE ID, the destination ID of the traffic, or/and the sub-group ID (for the TUE) within the UC group, etc., via Layer 1 (L1) signaling (such as DCI or SCI), MAC CE associated with the traffic, or/and in a higher layer entity (within the traffic) such as PDCP, RLC, or/and IP layer, in order for the SL transmission. In one embodiment, a TUE may provide, for example, during initial UC group setup or by a request for help from a UC group, an identification of the TUE (the TUE ID, or the packet destination ID in the UC group) to one or more CUEs in the UC group, allowing the one or more CUEs for forwarding any packets intended for the TUE. In other embodiments, if more than one CUE in a UC group, any TUE in the UC group may have at least one associated CUE configured to forward the packets intended for the TUE, which is activated by default; and the TUE in the UC group may have the other CUE(s) to help the TUE only on a demand basis, which may require additional signaling(s) to indicate or activate the forwarding functionality to the TUE.

Figure 7A:
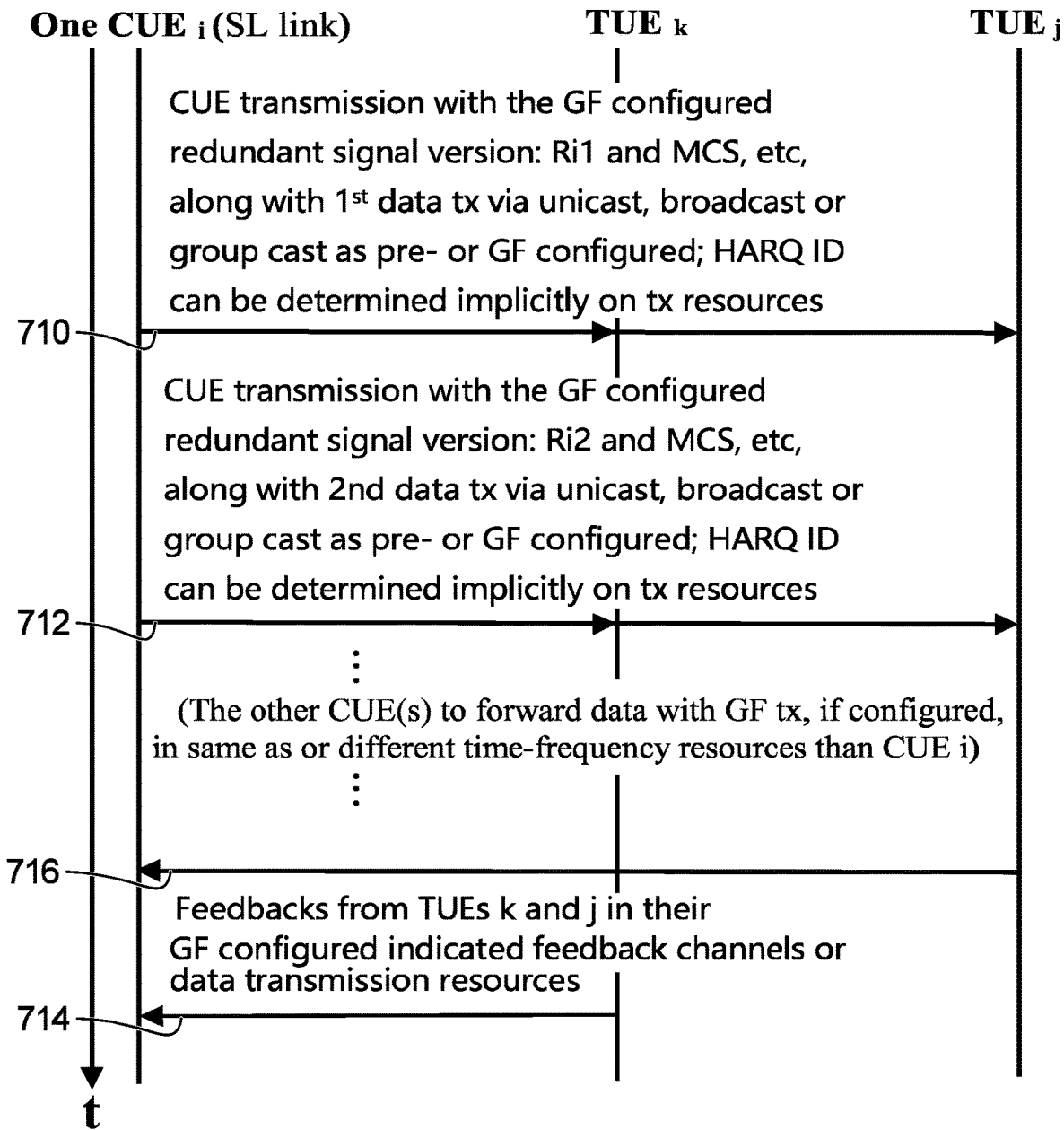
FIG. 7A is a signaling diagram showing an example of how one or more CUEs may send packet information to at least one TUE on a configured grant transmission resource without sidelink control information (SCI) according to an embodiment of the present disclosure.
Figure 7B:
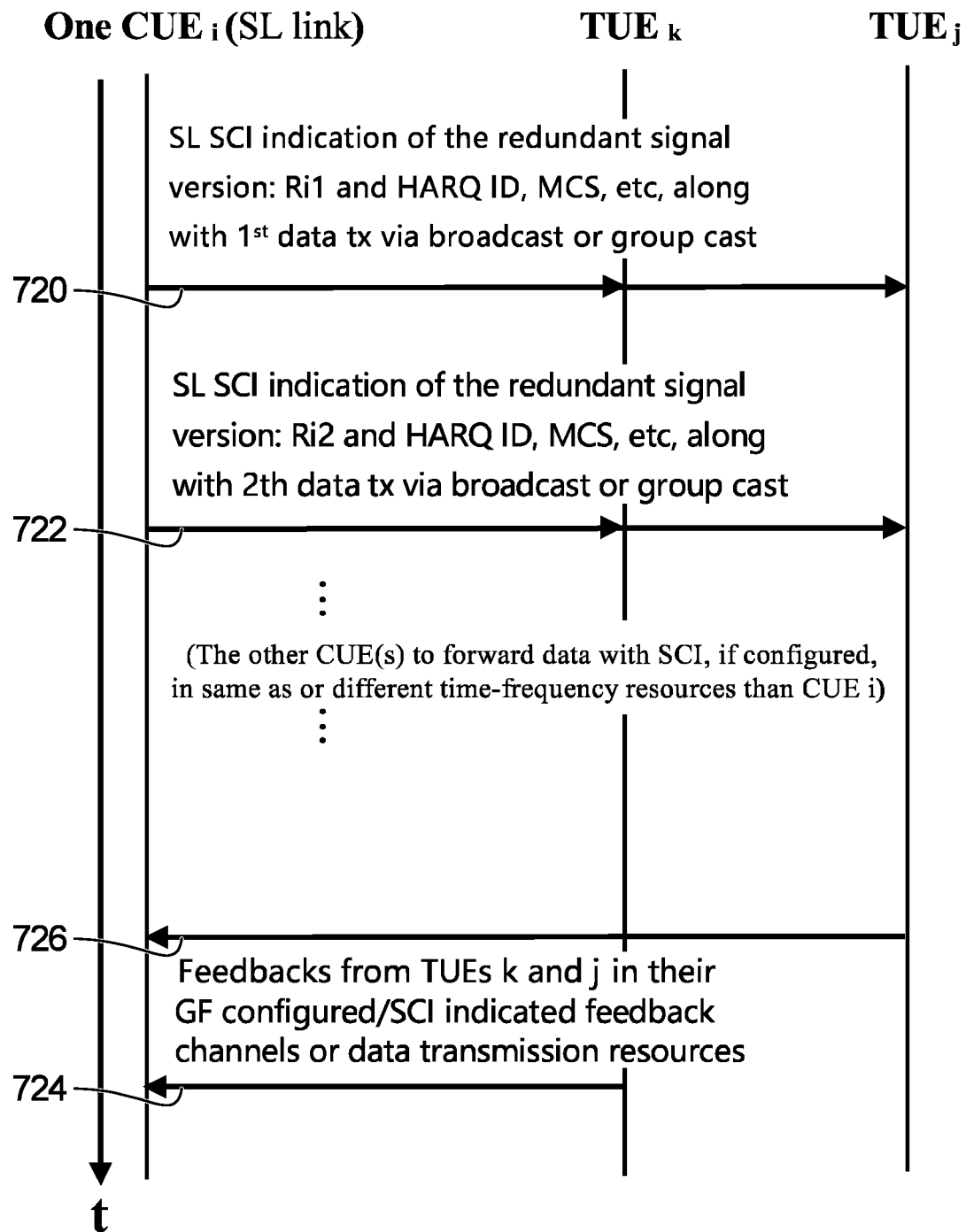
FIG. 7B is a signaling diagram showing an example of how one or more CUEs may send packet information to at least one TUE on a configured grant transmission resource with SCI according to an embodiment of the present disclosure.
Figure 7C:
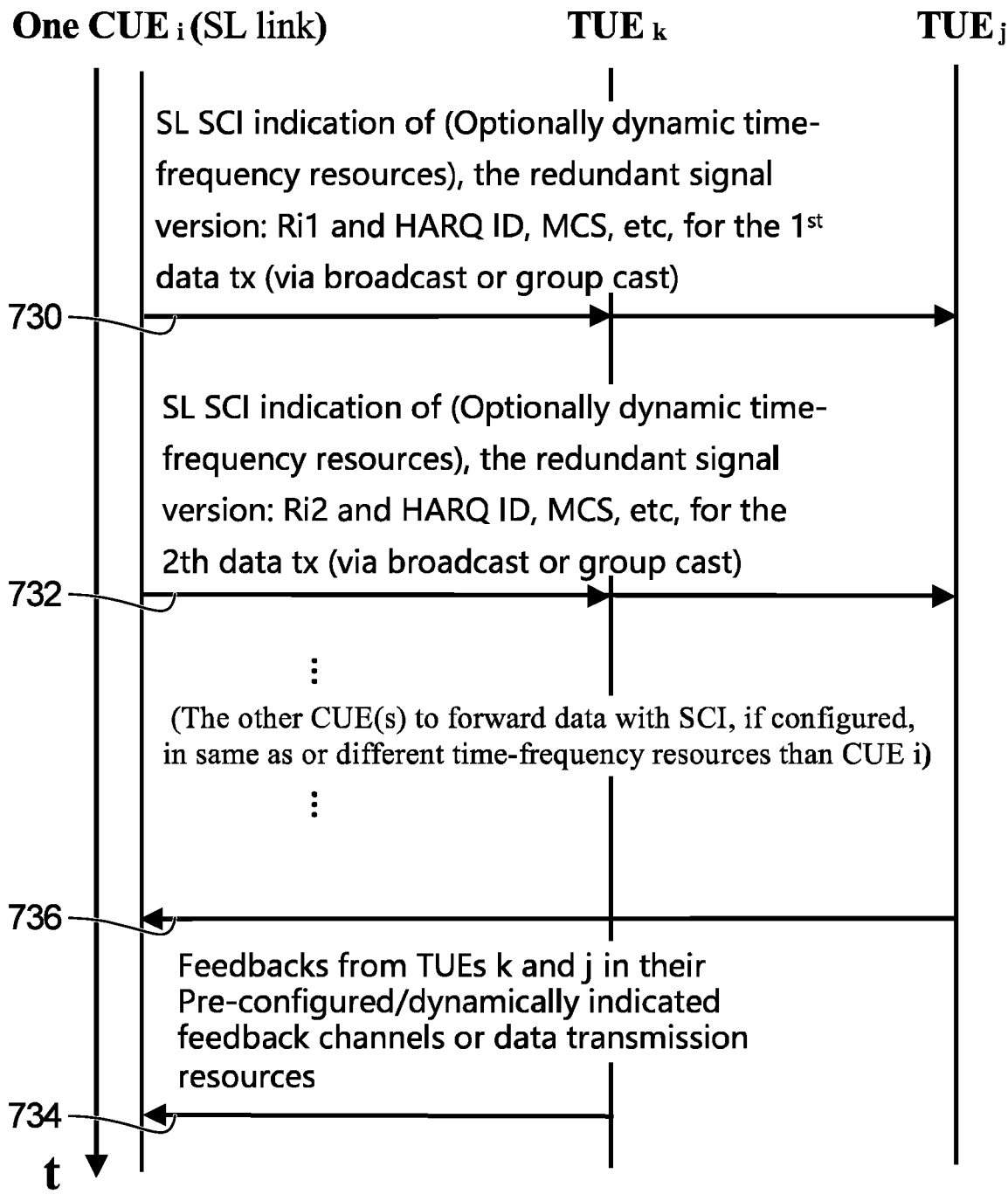
FIG. 7C is a signaling diagram showing an example of how one or more CUEs may send packet information to at least one TUE on a dynamically configured transmission resource using SCI according to an embodiment of the present disclosure.

FIGS. 7A, 7B and 7C provide examples of how a CUE may transmit and receive transmissions with one or more TUE. Although FIGS. 7A, 7B and 7C each show a CUE communicating with two TUEs, it is to be understood that other implementations may include the CUE communicating a single TUE or more than two TUEs. In addition, other implementations may involve a first CUE forwarding to a second CUE that is closer to a TUE than the first CUE, and then the second CUE forwarding to the TUE. In FIGS. 7A, 7B and 7C the vertical axis is a temporal axis and generally notes a passage of time. However, it is not intended that the signal messaging necessarily occurs in the exact order shown. Signaling to particular UEs may occur sequentially or simultaneously.

FIG. 7A illustrates an example of UE cooperative (UC) sidelink (SL) configured Grant (CG) transmissions of a TUE packet with redundant version signals without applying any dynamic indication or control message.

In the example of FIG. 7A, a CUE, identified as $CUE_i$ (where i indicated one of a configured group of UEs) has detected a packet intended for one or more TUEs, for example $TUE_k$ or $TUE_j$. At a first instance 710, $CUE_i$ performs a transmission in a configured grant transmission resource (that may have been configured as described above with reference to FIG. 6) and with a configured redundant signal version ($R_v1$) having a particular modulation and coding scheme (MCS) for a $1^{st}$ data transmission. The transmission may be transmitted via unicast, broadcast or group-cast depending on the CUE-TUE configuration relationship types as described in FIG. 5A, 5B, 5C or 5D. The particular format or transmission mode (e.g., group-cast) can be predefined, pre-configured or configured by configured grant transmission. A HARQ ID of the transmission can be determined implicitly by the TUE based on the configured transmission resources used for the transmission (e.g., time or/and frequency domain resources). For a first redundant transmission of the packet 712, $CUE_i$ will perform transmission in the configured grant transmission resource and with configured redundant signal version ($R_v2$) and with a particular MCS for the 2nd data transmission. The transmission can be transmitted via unicast, broadcast or group-cast, which can be predefined, pre-configured or GF configured. The same process can be repeated for third or fourth redundant transmissions, if configured, and so forth.

Meanwhile, any other CUE that has been notified that it should aid in the transmission of packets to $TUE_k$ and/or $TUE_j$ and that has successfully detected a packet can also forward the TUEs data with configured grant transmissions, if configured, in appropriately configured time-frequency resources, which may be the same as, or different from, $CUE_i$.

The feedback from $TUE_k$ and from $TUE_j$ to one or more CUEs, shown at instances 714 and 716, respectively, can be transmitted in configured grant feedback channels or other data transmission resources. Moreover, the feedback from $TUE_k$ and from $TUE_j$ to one or more CUEs can be optional. For example, in some cases of low latency applications, such as URLLC services, a particular number of repetitions may take a period of a few TTIs, which is close to the limit of the latency requirement window for the low latency applications. The feedback may not be meaningful, regardless of whether the transmission successful or not, as the network is done with the transmitted time-sensitive packet due to the latency limitations.

FIG. 7B illustrates an example of UC SL CG transmissions with sidelink control information (SCI) or uplink control information (UCI) for transmission of a TUE packet (with redundant version signals).

In the example of FIG. 7B, a CUE, identified again as CUE has detected a packet intended for one or more TUEs, for example $TUE_k$ or $TUE_j$. At a first instance 720, $CUE_i$ performs a transmission in a configured grant transmission resource (that may have been configured as described above with reference to FIG. 6) with SCI that includes one or more of: an identification of redundant signal version ($R_v1$), a particular MCS, a HARQ ID for a $1^{st}$ data transmission, diversity scheme, forwarding scheme, feedback related info and resource allocation/indication, CUE/source ID and TUE ID/designation ID in the UC group. The transmission in the SL may be transmitted via unicast, broadcast or group-cast and the transmission type can be predefined, pre-configured or configured by configured grant transmission. For a first redundant transmission of the packet 722, $CUE_i$ will perform transmission in the configured grant transmission resource with SCI that includes one or more of: an identification of redundant signal version ($R_v2$), a particular MCS and a HARQ ID for a 2nd data transmission, diversity scheme, forwarding scheme, feedback related info and resource allocation/indication, CUE/source ID and TUE ID/designation ID in the UC group. Optionally, the SCI may also include an indication as to which diversity/forwarding scheme or which one among more than one diversity/ forwarding scheme to use in either an initial or/and a redundant transmission. The transmission can be transmitted via unicast, broadcast or group-cast, which can be predefined, pre-configured or GF configured. The same process can be repeated for third or fourth redundant transmissions, if configured, and so forth.

Meanwhile, any other CUE that has been notified that it should aid in the transmission of packets to $TUE_k$ and/or $TUE_j$ and that has successfully detected a packet can also forward the TUEs data with configured grant transmissions, if configured, in appropriately configured time-frequency resources, which may be the same as, or different from, CUE.

The feedback from $TUE_k$ and from $TUE_j$ to one or more CUEs, shown at instances 724 and 726, respectively, can be transmitted in configured grant feedback channels or SCI dynamically indicated feedback channels or data transmission resources. Moreover, the feedback from $TUE_k$ and from $TUE_j$ to one or more CUEs can be optional. For example, in some cases of low latency applications, such as URLLC services, a particular number of repetitions may take a period of a few TTIs, which is close to the limit of the latency requirement window for the low latency applications. The feedback may not be meaningful, regardless of whether the transmission successful or not, as the network is done with the transmitted time-sensitive packet due to the latency limitations.

FIG. 7C illustrates an example of UC SL GB transmissions with SCI or UCI for transmission of a TUE packet with redundant version signals by applying a dynamic indication or control message.

In the example of FIG. 7C, a CUE, identified again as $CUE_i$ has detected a packet intended for one or more TUE, for example $TUE_k$ or $TUE_j$. At a first instance 730, $CUE_i$ performs a transmission on a dynamically configured transmission resource by SCI which also includes an identification of redundant signal version ($R_v1$), a particular MCS and a HARQ ID for a $1^{st}$ data transmission. The transmission in the SL may be transmitted via unicast, broadcast or group-cast, and the transmission type can be predefined, pre-configured or configured by configured grant transmission. For a first redundant transmission of the packet 732, $CUE_i$ will perform transmission in a dynamically configured transmission resource by SCI that also includes an identification of redundant signal version ($R_v2$), a particular MCS and a HARQ ID for a 2nd data transmission. Optionally, the SCI may also include an indication as to which diversity/forwarding scheme or which one among more than one diversity/forwarding scheme to use in an initial or/and a redundant transmission. The transmission can be transmitted via unicast, broadcast or group-cast, which can be predefined, pre-configured or GF configured. The same process can be repeated for third or fourth redundant transmissions, if configured, and so forth.

Meanwhile, any other CUE that has been notified that it should aid in the transmission of packets to $TUE_k$ and/or $TUE_j$ and that has successfully detected a packet can also forward the TUEs data with grant based transmissions, if configured, in dynamically SCI configured transmission resources, which may be the same as, or different from, $CUE_i$ along with the SCI indicated other transmission parameters.

The feedback from $TUE_k$ and from $TUE_j$ to one or more CUEs, shown at instances 734 and 736, respectively, can be transmitted in pre-configured or SCI dynamically indicated feedback channels or data transmission resources. Moreover, the feedback from $TUE_k$ and from $TUE_j$ to one or more CUEs can be optional. For example, in some cases of low latency applications, such as URLLC services, a particular number of repetitions may take a period of a few TTIs, which is close to the limit of the latency requirement window for the low latency applications. The feedback may not be meaningful, regardless of whether the transmission successful or not, as the network is done with the transmitted time-sensitive packet due to the latency limitations.

Figure 8:
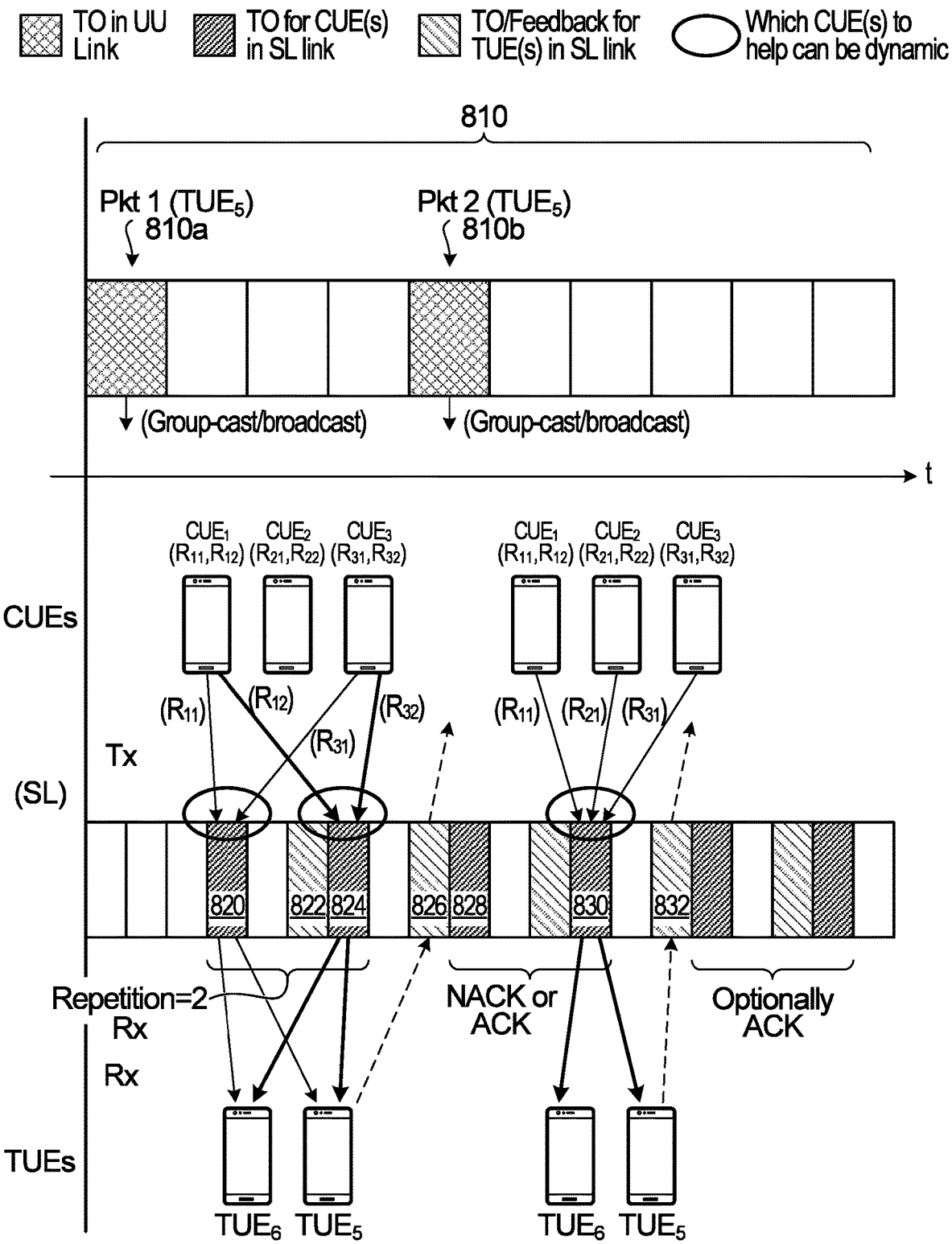
FIG. 8 is a schematic diagram showing an example of redundant signaling for packet transmission by a base station, packet forwarding by multiple CUEs to multiple TUEs and transmitting acknowledgements by a TUE, according to embodiments of the present disclosure.

FIG. 8 is a schematic diagram showing examples of transmission of packets over a Uu link from a base station to multiple CUEs and then several of the CUEs forwarding the packets onto multiple TUEs. The horizontal axis is representative of increasing time.

Multiple packets 810 are shown being transmitted on the Uu link. In particular 810a and 810b are two packets being transmitted to $TUE_5$ in respective transmission opportunities (TOs). The packets are group-cast or broadcast in the Uu link so as to enable any CUEs that can receive the packets and if having correctly decoded one or more of the packets, to forward to $TUE_5$, where DF forwarding scheme is assumed. In another embodiment, the packets are unicast in the Uu link to individual CUEs (respectively) in dedicated or shared resources that can receive the packets and if having correctly decoded one or more of the packets, to forward to $TUE_5$, where DF forwarding scheme is assumed. In some embodiments, the designated CUEs (i.e., $CUE_1$, $CUE_2$, and $CUE_3$ in this case) will utilize the AF scheme to forward the received packets to $TUE_5$ in respective transmission opportunities (TOs).

$CUE_1$ receives the first packet (Pkt 1) and forwards a first redundant signal version ($R_{1,1}$) of the packet in a first sidelink (SL) transmission opportunity (TO) 820. $CUE_2$ is not shown forwarding the packet; this may be because $CUE_2$ do not receive Pkt 1, or did not receive a version of Pkt 1 worth transmitting. $CUE_3$ receives Pkt 1 and forwards a first redundant signal version ($R_{3,1}$) of the packet in the first SL TO 820. Arrows pointing from $CUE_1$ and $CUE_3$ to SL TO 820 and from SL TO 820 to the $TUE_5$ and $TUE_6$ are simply for clarity to show when the CUEs are transmitting and then that the contents of SL TO 820 are broadcast to which respective TUEs.

TO 822 is configured resource used for an acknowledgment (ACK) or a negative acknowledgement (NACK) to be (optionally) sent from $TUE_5$ (or $TUE_6$ not shown in the figure) to any of the CUEs (or to receive by any of the CUEs). In this particular instance TUEs does not send an ACK or NACK. Since $CUE_1$ and $CUE_3$ do not receive an ACK or NACK, they send a repetition of Pkt 1 in next configured resource (i.e., TO 824 in this case). $CUE_1$ forwards a second redundant signal version ($R_{1,2}$) of the packet (Pkt 1) in a second SL TO 824. $CUE_2$ once again does not forward the packet. $CUE_3$ forwards a second redundant signal version ($R_{3,2}$) of the packet in the second SL TO 824. Arrows pointing from $CUE_1$ and $CUE_3$ to SL TO 820 and from SL TO 820 to the TUEs and $TUE_6$ are simply for clarity to show when the CUEs are transmitting and then that the contents of SL TO 820 are broadcast to which respective TUEs. In some embodiments, TOs 820 and 824 each can be shared resource among different CUEs or can be split (e.g., time, frequency, spatial, etc.) resources for the data/control info transmissions among the CUEs; and TO 822 can be shared resource among different TUEs or can be split (e.g., time, frequency, spatial, etc.) resources for the data/control info transmissions among the TUEs; and the above statements are also applicable to other SL TOs (such as TOs 826, 828, etc.) in FIG. 8.

TO 826 is for an ACK or a NACK to be (optionally) sent from $TUE_5$ (or $TUE_6$) to any of the CUEs. In this particular instance TUEs does send an ACK as a result of the maximum number of the configured transmissions (i.e., 2) for the Pkt 1 having been achieved. Optionally, one or more of the CUEs can then forward the ACK to the base station (not shown).

With respect to a second Packet (Pkt 2), $CUE_1$ is receives it and forwards a first redundant signal version ($R_{1,1}$) of the packet in a first SL TO 830. $CUE_2$ receives Pkt 2 (e.g., correctly) and forwards a first redundant signal version ($R_{2,1}$) of Pkt 2 in the first SL TO 830. $CUE_3$ receives Pkt 2 and forwards a first redundant signal version ($R_{3,1}$) of the packet in the first SL TO 830.

TO 832 is for an ACK or a NACK to be (optionally) sent from TUEs to any of the CUEs. In this particular instance TUEs (as correctly decoding the Pkt 2) does send an ACK to avoid the CUEs to send more repetitions of Pkt 2, thus reducing the intra-cell and inter-cell interference in the network.

Redundant signal version and repetition configuration for each CUE can be pre-configured, semi-statically configured or dynamically configured, as described above.

Figure 9:
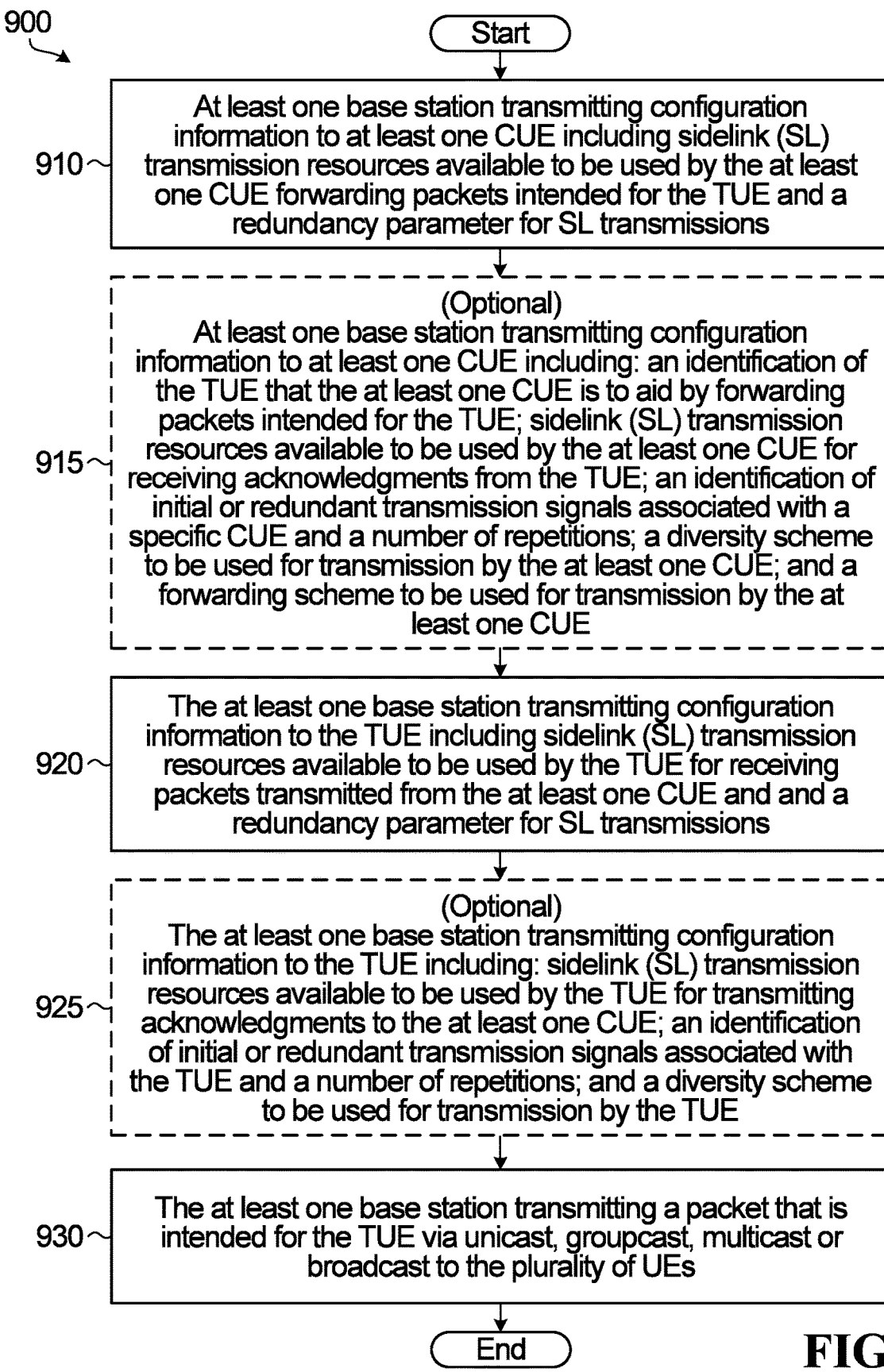
FIG. 9 is a flow chart illustrating an example method performed by a base station according to an embodiment of the present disclosure.

FIG. 9 is an example flow diagram 900 that describes a method how UE cooperation can be performed in accordance with an aspect of this disclosure. The flow diagram 900 involves a base station configuring one or more CUEs and one or more TUEs as one UC group, and then transmitting packets upon traffic arrivals over the Uu link. Prior to the configuration of the CUEs and TUEs the base station may have determined an appropriate UE group that contains the CUEs and TUEs, and then provided through configuration (with higher-layer and/or L1 signaling) the UEs in the group with UE cooperation (UC) group pertinent UC grouping information such as which CUE(s) to help which TUE(s) and some shared information on each TUE, e.g., UE ID, subgroup ID in the UC group, and/or UE scrambling ID, etc., by the configured helping CUE(s). The base station may configure and transmit the UC grouping information to the UEs together with a configuration procedure of other operation modes (such as V2X, normal NR), e.g., UE resource and parameter configuration information. Or, the base station may configure UC mode separately (or independently) from that of the other operation modes.

At 910, at least one base station transmits configuration information to at least one CUE. The configuration information includes at least: sidelink (SL) transmission resources available to be used by the at least one CUE forwarding packets intended for the TUE (or TUEs) and a redundancy parameter for SL transmissions. At 915, the configuration information may also optionally include: an identification of a TUE (or more TUEs) that the at least one CUE is to aid by forwarding packets intended for the TUE (or TUEs); sidelink (SL) transmission resources available to be used by the at least one CUE for receiving acknowledgments from the TUE (or TUEs); an identification of redundant transmission signals associated with a specific CUE and a number of repetitions; a diversity scheme to be used for transmission by the at least one CUE; and a forwarding scheme to be used for transmission by the at least one CUE. Additionally, or alternatively, the TUE may provide an identification of the TUE to at least one CUE during initial UE cooperation setup or during a request procedure that the TUE asks for help from the CUE.

At 920, the at least one base station transmits configuration information to the TUE. The configuration information includes at least: SL transmission resources available to be used by the TUE for receiving packets transmitted from the at least one CUE and a redundancy parameter for SL transmissions. At 925, the at least one base station optionally transmits configuration including SL transmission resources available to be used by the TUE for transmitting acknowledgments to the at least one CUE; an identification of initial or redundant transmission signals associated with the TUE and a number of repetitions; and a diversity scheme to be used for transmission by the TUE.

At 930, the at least one base station transmits a packet that is intended for the TUE via unicast, groupcast, multicast or broadcast to the plurality of UEs.

Figure 10:
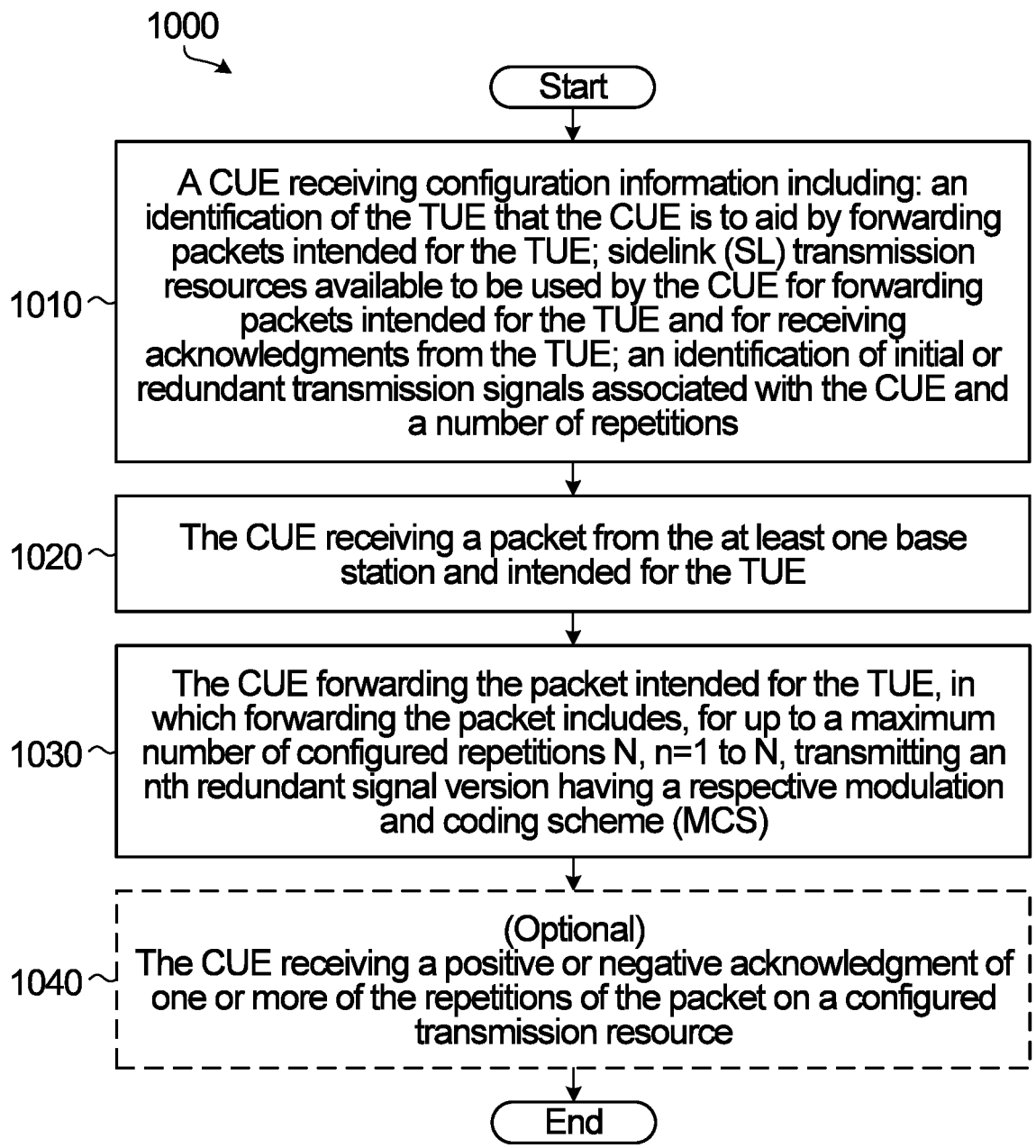
FIG. 10 is a flow chart illustrating an example method performed by a cooperating UE (CUE) according to an embodiment of the present disclosure.

FIG. 10 is an example flow diagram 1000 that describes a method how UE cooperation can be performed in accordance with an aspect of this disclosure. The flow diagram 1000 involves a UE that is a CUE receiving configuration information from a base station, receiving packets intended for at least one TUE over the Uu link and forwarding the packets onto the at least one TUE over the SL links.

At 1010, a CUE receives configuration information including: an identification of the TUE that the CUE is to aid by forwarding packets intended for the TUE; sidelink (SL) transmission resources available to be used by the CUE for forwarding packets intended for the TUE and for receiving acknowledgments from the TUE; an identification of initial or redundant transmission signals associated with the CUE and a number of repetitions. Additionally, or alternatively, the CUE may receive an identification of the TUE from the TUE during initial UE cooperation setup or during a request procedure that the TUE asks for help from the CUE.

At 1020, the CUE receives a packet from the at least one base station and intended for the TUE.

At 1030, the CUE forwards the packet intended for the TUE, in which forwarding the packet includes, for up to a maximum number of configured repetitions N, n=1 to N, transmitting an nth redundant signal version having a respective modulation and coding scheme (MCS). These parameters for a SL transmission, such as a maximum number of transmission repetitions, each associated redundant version, and a MCS for each transmission, can be semi-statically configured via higher layer signaling such as RRC and/or indicated dynamically by SL SCI, as described in previous paragraphs.

At 1040, in an optional step, the CUE receives a positive or negative acknowledgment of one or more of the repetitions of the packet on a configured transmission resource from the TUE.

While flow diagram 1000 describes a process for a single CUE receiving configuration information, receiving packets intended for a TUE, and forwarding packets to the TUE, it is to be understood that multiple CUEs could be operating in the same manner for a group of UEs and one or more of the CUEs could be forwarding to multiple TUEs, if so configured.

While flow diagram 1000 describes a CUE forwarding to a TUE, alternative embodiments may include the CUE forwarding to a second CUE that is closer to a TUE than the CUE, and then the second CUE forwarding to the TUE.

Figure 11:
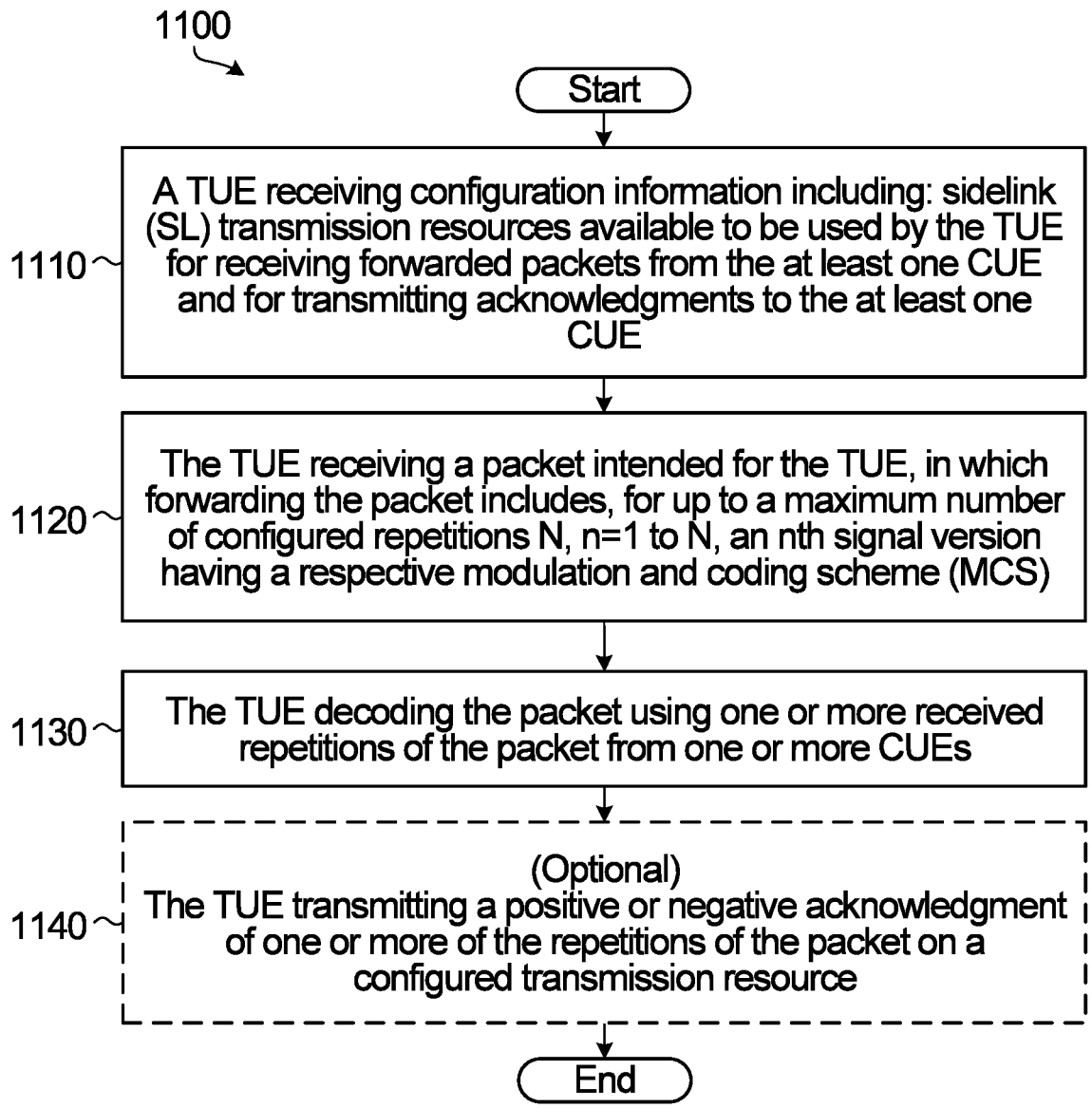
FIG. 11 is a flow chart illustrating an example method performed by a target UE (TUE) according to an embodiment of the present disclosure.

FIG. 11 is an example flow diagram 1100 that describes a method how UE cooperation can be performed in accordance with an aspect of this disclosure. The flow diagram 1100 involves a UE that is a TUE receiving configuration information from a base station, receiving packets intended for at least one TUE over the SL link, decoding the received packets and sending an acknowledgement to the at least one CUE over the SL links. In some embodiments, to be able to receive forwarded traffic from one or more CUEs, the TUE may provide an identification of the TUE to at least one CUE during initial UE cooperation setup or during a request procedure that the TUE asks for help from the CUE.

At 1110, a TUE receives configuration information including: sidelink (SL) transmission resources available to be used by the TUE for receiving forwarded packets from the at least one CUE and for transmitting acknowledgments to the at least one CUE.

At 1120, the TUE receives a packet intended for the TUE, in which forwarding the packet from a CUE includes, for up to a maximum number of configured repetitions N, n=1 to N, an nth redundant signal version having a respective modulation and coding scheme (MCS).

At 1130, the TUE decodes the packet using one or more received repetitions of the packet from one or more CUEs.

At 1140, in an optional step, the TUE transmits a positive or negative acknowledgment of one or more of the repetitions of the packet on a configured transmission resource.

While flow diagram 1100 describes a process for a single TUE receiving configuration information, receiving packets intended for a CUE, decoding the packets and forwarding an acknowledgement of receipt of the packets to the CUE, it is to be understood that multiple TUEs could be operating in the same manner and one or more of the TUEs could be forwarding to multiple CUEs, if so configured.

One possible application of sidelink (SL) communications is vehicle to everything/anything (V2X) communication, for example, which is an increasingly important new category of communication that may become widespread in next generation wireless communication networks, such as 5G New Radio (NR) systems. V2X refers to a category of communication scenarios, including communication from a vehicle to another vehicle (V2V), vehicle to infrastructure (V2I), and vehicle to pedestrian (V2P), for example. In general, a vehicle communicating in a network is considered user equipment (UE).

The communication in V2X systems may be performed using links between the network and the UE, such as an uplink (UL) and a downlink (DL). The UL is a wireless communication from a UE to a base station (BS), and the DL is a wireless communication from a BS to a UE. In V2V communication using the UL and DL, data is transmitted from a transmitting UE to a BS, and then transmitted from the BS to a receiving UE.

Alternatively, some of the V2X communication scenarios may be device to device (D2D) communications, in which case the transmission in V2X systems may be performed between the transmitting UE and receiving UE using a sidelink (SL). The SL allows data to be transmitted directly from the transmitting UE to the receiving UE, without forwarding the data via the BS.

In general, the SL and UE cooperation may enhance the reliability, throughput, and capacity of any wireless communications. However, successful UE cooperation requires proper management of the SL between CUEs and TUEs in order to reduce interference and improve UE cooperation benefits.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
  receiving, by a user equipment (UE) from a base station, configuration information comprising an indication of resources for a sidelink (SL) transmission, a redundancy parameter for the SL transmission, and an identification of a cooperative user equipment (CUE), where the CUE is to aid by forwarding, via the SL transmission, a packet intended for the UE based on an identification of the UE in a higher layer data portion of the packet;
  receiving, by the UE, a first packet that is forwarded by the CUE via the SL transmission, where the first packet is received by the CUE from the base station and intended for the UE, and where the UE also receives sidelink control information (SCI) from the CUE for further configuring the SL transmission; and
  receiving, by the UE, a second packet from the base station via Uu link.

2. The method of claim 1, wherein the configuration information comprises:
  SL transmission resources available to be used by the UE for receiving the first packet that is forwarded from the CUE via the SL transmission; and
  an identification of initial or redundant transmission signals associated with the UE and a number of repetitions.

3. The method of claim 1, wherein the SL transmission resources are a configured grant transmission resource or dynamically scheduled; and wherein receiving the first packet comprises one of:
  receiving the first packet using one or more repetitions on at least one configured grant transmission resource, wherein the SCI is for configuring one or more of: redundant version signal information, forwarding scheme, feedback related information and resource allocation/indication, CUE/source identifier (ID) in a UE cooperation (UC) group, TUE ID/designation ID in the UC group and modulation and coding scheme (MCS); or
  receiving the first packet using one or more repetitions on at least one transmission resource that is dynamically scheduled, wherein the SCI is for configuring one or more of: redundant version signal information, a hybrid automatic repeat request (HARQ) ID associated with the first packet, diversity scheme, forwarding scheme, TUE ID/designation ID in the UC group and MCS.

4. The method of claim 1, wherein the receiving configuration information comprises receiving via at least one of higher layer signaling message or dynamic signaling message.

5. The method of claim 1, wherein the higher layer of the higher layer data portion of the packet comprises a layer higher than physical layer.

6. The method of claim 5, wherein the higher layer of the higher layer data portion of the packet is at least one of packet data convergence protocol (PDCP), radio link control (RLC), or Internet Protocol (IP) layer.

7. The method of claim 1, wherein:
  the receiving, by the UE, the first packet comprises receiving via unicast or groupcast: or
  the receiving, by the UE, the first packet comprises receiving according to a redundancy parameter for the SL transmission.

8. The method of claim 1 further comprising, transmitting, by the UE, to the CUE, a third packet that is forwarded by the CUE to the base station.

9. The method of claim 1 further comprising, transmitting, by the UE, a fourth packet to the base station via Uu link.

10. The method of claim 1 further comprising the second packet and the first packet may be redundant versions of the same information transmitted, and wherein received signals of the second packet from the base station and received signals from the first packet from the CUE may be combined.

11. A device comprising:
  a processor; and
  a non-transitory computer-readable medium having stored thereon computer-implemented instructions, that when executed by the processor cause the device to:
  receive configuration information, from a base station, comprising an indication of resources for a sidelink (SL) transmission, a redundancy parameter for the SL transmission, and an identification of the cooperative user equipment (CUE), wherein the CUE is to aid by forwarding, via the SL transmission, a packet intended for the TUE, based on an identification of the UE in a higher layer data portion of the packet;

receive a first packet that is forwarded by the CUE via the SL transmission, where the first packet is received by the CUE from the base station and intended for the UE and where the UE also receives sidelink control information (SCI) from the CUE for further configuring the SL transmission; and receive a second packet from the base station via Uu link.

12. The device of claim 11, wherein the configuration information comprises:
SL transmission resources available to be used by the device for receiving the first packet that is forwarded from the CUE via the SL transmission; and
an identification of initial or redundant transmission signals associated with the device and a number of repetitions.

13. The device of claim 11, wherein the SL transmission resources are a configured grant transmission resource or dynamically scheduled and the instructions further cause the device to receive the first packet by one of:
receiving the first packet using one or more repetitions on at least one configured grant transmission resource, wherein the SCI is for configuring one or more of: redundant version signal information, forwarding scheme, feedback related information and resource allocation/indication, CUE/source identifier (ID) in a UE cooperation (UC) group, TUE ID/designation ID in the UC group and modulation and coding scheme (MCS); or
receiving the first packet using one or more repetitions on at least one transmission resource that is dynamically scheduled, wherein the SCI is for configuring one or more of: redundant version signal information, a hybrid automatic repeat request (HARQ) ID associated with the first packet, diversity scheme, forwarding scheme, TUE ID/designation ID in the UC group and MCS.

14. The device of claim 11, wherein the instructions to receive the configuration information comprise instructions to receive via at least one of higher layer signaling message or dynamic signaling message.

15. The device of claim 11, wherein the higher layer of the higher layer data portion of the packet comprises a layer higher than physical layer.

16. The device of claim 15, wherein the higher layer of the higher layer data portion of the packet is at least one of packet data convergence protocol (PDCP), radio link control (RLC), or Internet Protocol (IP) layer.

17. The device of claim 11, wherein the instructions to:
receive the first packet intended for the UE comprise instructions to receive via unicast or groupcast; or
receive the first packet intended for the UE comprise instructions to receive according to a redundancy parameter for the SL transmission.

18. The device of claim 11 further comprising instructions to transmit to the CUE, a third packet that is forwarded by the CUE to the base station.

19. The device of claim 11 further comprising instructions to transmit a fourth packet to the base station via Uu link.

20. The device of claim 11 further comprising the second packet and the first packet may be redundant versions of same information transmitted, and received signals of the second packet from the base station and received signal from the first packet from the CUE may be combined.

* * * * *